United States Patent

[11] 3,614,745

[72] Inventors Albert Podvin
Woodland Hills, Calif.;
Michael J. Flynn, Evanston, Ill.
[21] Appl. No. 858,022
[22] Filed Sept. 15, 1969
[45] Patented Oct. 19, 1971
[73] Assignee International Business Machines
Armonk, N.Y.

[54] APPARATUS AND METHOD IN A MULTIPLE OPERAND STREAM COMPUTING SYSTEM FOR IDENTIFYING THE SPECIFICATION OF MULTITASKS SITUATIONS AND CONTROLLING THE EXECUTION THEREOF
3 Claims, 21 Drawing Figs.

[52] U.S. Cl. .......... 340/172.5
[51] Int. Cl. .......... G06f 15/16
[50] Field of Search .......... 340/172.5; 235/157

[56] References Cited
UNITED STATES PATENTS

| | | | |
|---|---|---|---|
| Re.26,171 | 3/1967 | Falkoff | 340/172.5 |
| 3,411,139 | 11/1968 | Lynch et al. | 340/172.5 |
| 3,440,616 | 4/1969 | Aranyi et al. | 340/172.5 |
| 3,444,525 | 5/1969 | Barlow et al. | 340/172.5 |
| 3,480,914 | 11/1969 | Schlaeppi | 340/172.5 |
| 3,480,916 | 11/1969 | Belt et al. | 340/172.5 |

*Primary Examiner*—Gareth D. Shaw
*Attorneys*—Peter R. Leal and Hanifin and Jancin

ABSTRACT: A system is described, useful in a multiple operand stream, or parallel, data processing system, for detecting the specification of independent tasks which can be operated upon in parallel. The specification of the independent parallel operable tasks is given by a fork instruction specifying the number of tasks and the physical or logical function to be performed for the task. A fork point can therefore be visualized as a logical node point where a given class of physical or logical tasks is undertaken. There is control apparatus associated with each node point. The control apparatus is a resource distributor-manager and also a controller into which each system resource reports when it has become free from whatever other task it was performing. The control apparatus dynamically allocates resources to the tasks in the fork on an as-available basis. The fork ends at a join point where data from the parallel tasks is coordinated. In one embodiment, the processor which initiated the fork may reach the join point, and apparatus is provided which gives this processor the options to wait for all tasks to be completed and coordinate data itself; to become one of the fork processors and help out by taking on an undistributed task, if one or more tasks remain undistributed; or to abort, for example under priority interrupt, and go to another job leaving the data to be coordinated by another processor in the system.

The control apparatus includes subsystems, each comprising first and second queueing means, the first queueing means for queueing fork instructions as they are issued, and second queueing means for allowing the control of a plurality of fork instructions at a given time.

INVENTORS
ALBERT PODVIN
MICHAEL J. FLYNN

BY [signature]

ATTORNEY

FIG. 2B-B

| N1 | N2 | S | P | (P/L) | ✱ | I | RETURN | N3 | N4 | ID | $(P/L)_{I-1}$ |
|---|---|---|---|---|---|---|---|---|---|---|---|
| 7 | 7 | S1 | P1 | 1 | 0 | 1 | ADDRESS OF OP(N+1) | 1 | 0 | 0 | 0 |

FSW OF FORK $(R_1,Q_1)$.

| N1 | N2 | S | P | (P/L) | ✱ | I | RETURN | N3 | N4 | ID | $(P/L)_{I-1}$ |
|---|---|---|---|---|---|---|---|---|---|---|---|
| 3 | 7 | S4 | P4 | 1 | 0 | 1 | ADDRESS OF OP(N+1) | 1 | 0 | 0 | 0 |

FSW OF FORK $(R_1,Q_1)$

| N1 | N2 | S | P | (P/L) | ✱ | I | RETURN | N3 | N4 | ID | $(P/L)_{I-1}$ |
|---|---|---|---|---|---|---|---|---|---|---|---|
| 4 | 4 | $S_3(S_1)$ | $S_3(P_1)$ | 2 | 0 | 0 | ADDRESS OF $(S_3,P_3)_C$ | 1 | 1 | 3 | 1 |

FSW OF FORK $(R_2,Q_2)$

| N1 | N2 | S | P | (P/L) | ✱ | I | RETURN | N3 | N4 | ID | $(P/L)_{I-1}$ |
|---|---|---|---|---|---|---|---|---|---|---|---|
| 0 | 0 | 0 | 0 | 2 | 0 | 0 | ADDRESS OF $(S_3,P_3)_C$ | 1 | 1 | 3 | 1 |

FSW OF FORK $(R_2,Q_2)$

| N1 | N2 | S | P | (P/L) | * | I | RETURN | N3 | N4 | ID | $(P/L)_{I-1}$ |
|---|---|---|---|---|---|---|---|---|---|---|---|
| 3 | 7 | S4 | P4 | 1 | 1 | 1 | ADDRESS OF OP (N+1) | 1 | 0 | 0 | 0 |
FSW OF FORK $(R_1, Q_1)$
FIG. 2G
| N1 | N2 | S | P | (P/L) | * | I | RETURN | N3 | N4 | ID | $(P/L)_{I-1}$ |
|---|---|---|---|---|---|---|---|---|---|---|---|
| 0 | 0 | $S_3(S_1)$ | $S_3(P_1)$ | 2 | 1 | 0 | ADDRESS OF $(S_3, P_3)_C$ | 1 | 1 | 1 | 3 |
FSW OF FORK $(R_2, Q_2)$
FIG. 2H
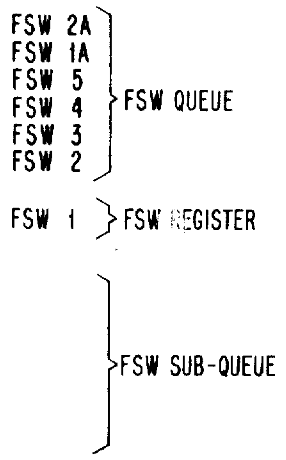
FIG. 2K
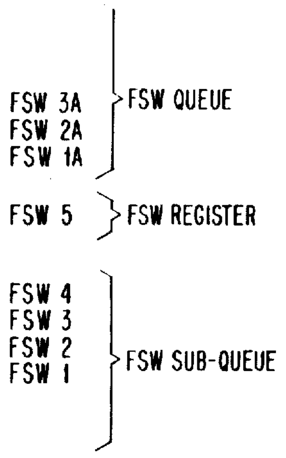
FIG. 2L
FIG. 4A
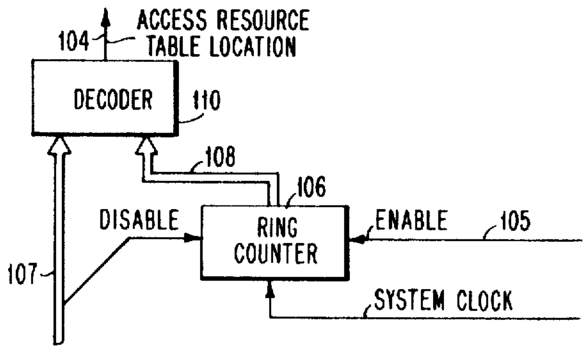

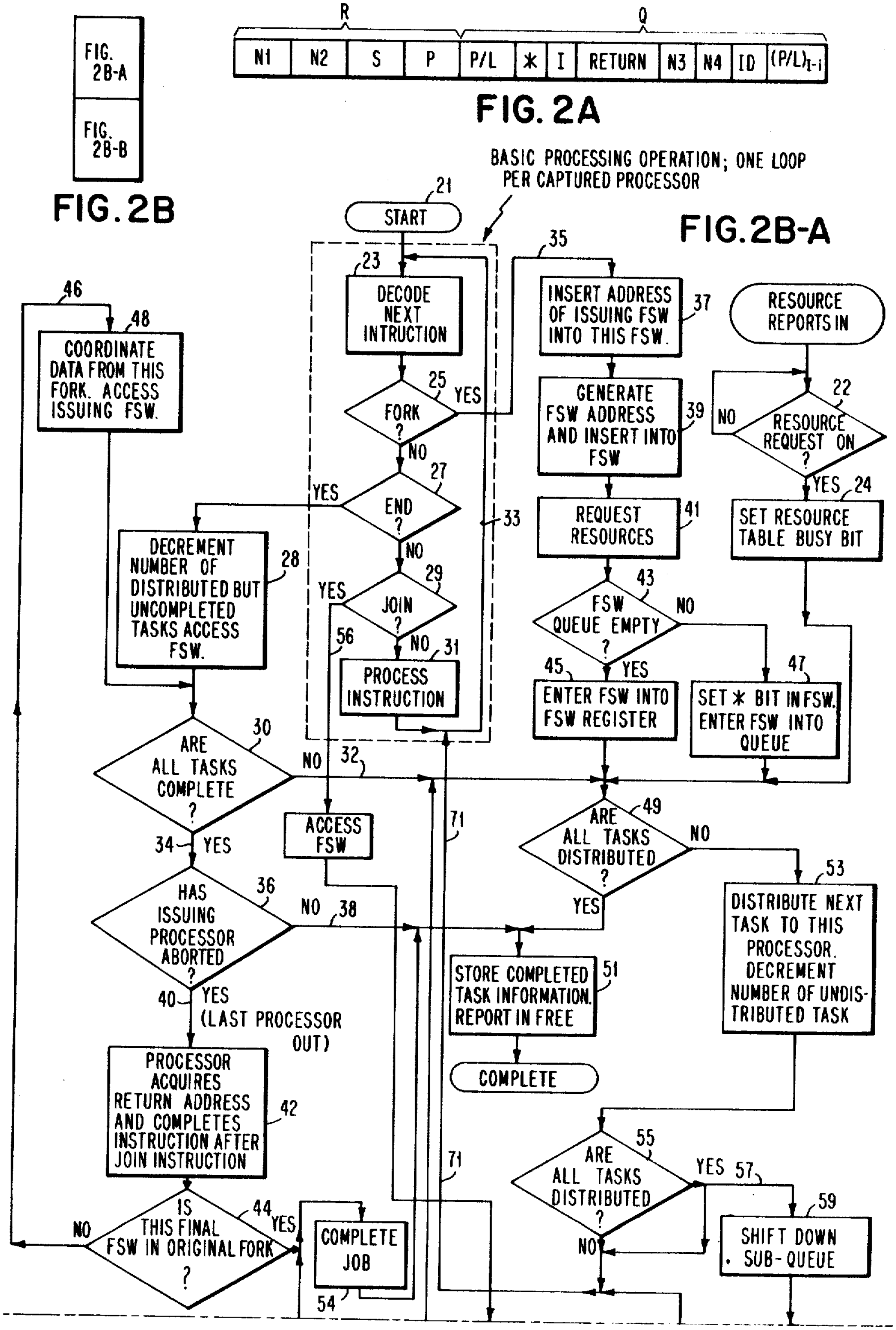
FIG. 2B FIG. 2A FIG. 2B-A

| I.D. | (P/L)I | B | F |
|---|---|---|---|
| 1 | (P/L)1 | 1/0 | 1/0 |
| 2 | (P/L)1 | 1/0 | 1/0 |
| 3 | (P/L)2 | 1/0 | 1/0 |
| 4 | (P/L)2 | 1/0 | 1/0 |
| 5 | (P/L)2 | 1/0 | 1/0 |
| 6 | (P/L)N | 1/0 | 1/0 |
| 7 | (P/L)N | 1/0 | 1/0 |
| 8 | (P/L)N | 1/0 | 1/0 |

APPARATUS AND METHOD IN A MULTIPLE OPERAND STREAM COMPUTING SYSTEM FOR IDENTIFYING THE SPECIFICATION OF MULTITASKS SITUATIONS AND CONTROLLING THE EXECUTION THEREOF

BACKGROUND OF INVENTION

1. Field of the Invention

This invention relates to apparatus and a method useful in a multiple instruction stream, multiple data stream computer system. More particularly, this invention relates to an improved combination of digital apparatus and method steps useful in enhancing the through-put of parallel processing computing systems.

2. Description of Prior Art

The complexities of modern life have generated the need for the electronic processing of vast amounts of data. Such electronic processing of data has freed man from the bonds of trivial and menial tasks and has endowed him with the precious commodity of time during which to focus his endeavors upon more creative matters. The recognition of electronic data processing as a boon to modern man has generated the codification of more and more tasks into a form suitable for electronic data processing. This, in turn, has triggered the development of large-scale, ultrafast, electronic digital computer systems which process these tasks by processing sequences of instructions within the computer system. To meet the ever-increasing needs of data processing, speed in processing instructions is of the essence. To meet the demands in speed, work has recently been done in the area of parallel processing of independent tasks. Such prior work includes investigation into means and methods to provide resource effectiveness under various problem program environments. In order to accomplish this, prior art apparatus and methods have been achieved which attempt to identify parallel tasks and make some effort at assigning digital resources to perform these independent tasks concurrently. An example of such prior art is seen in the paper, "A Multiprocessor System Design" by M. E. Conway, *AFIPS Conference Proceedings*, 1963 Fall Joint Computer Conference, page 139.

However, such prior art apparatus and methods often suffer from the drawback of failure to utilize the system resources efficiently and effectively. Such prior art systems often count the number of tasks to be performed and then statically attempt to assign resources to these number of tasks. This often fails to achieve optimum system efficiency in that it does not assign resources dynamically to the parallel tasks involved. Such systems also suffer from the defect of allowing an intolerable amount of system resource downtime at that phase of operation at which the termination of the parallel tasks takes place.

Accordingly, it is the general object of this invention to provide an improved means and method to provide optimum resource effectiveness under various problem program environments involving parallel data processing.

It is another object of this invention to provide an apparatus and method for identifying multitask situations and also for identifying the nature of the tasks, in order to allow the dynamic allocation of system resources on an as-available basis.

It is also an object of this invention to provide means and a method in a multioperand stream data processing system for allowing the dynamic allocation of system resources to independently operable tasks, wherein essentially no resource downtime is involved in the allocation of resources at the initiation of processing a group of parallel tasks, or in the coordination of data at the termination of the processing of said tasks.

SUMMARY OF THE INVENTION

Apparatus and the method is disclosed for identifying specified multitask situations in a parallel processing system such as the system disclosed in copending application, Ser. No. 813,024, filed Apr. 3, 1969, and assigned to the assignee of the present invention.

A multitask situation is indicated by a free fork instruction with its associated fork status word (hereinafter referred to as FSW). In a parallel processing environment, processors may be designated $P_1$, $P_2$,...$P_j$,..., $P_N$, as shown in the above referenced application.

A given processor $P_i$ executes instructions sequentially until it reaches a free fork instruction, at which point it issues an FSW to the Control apparatus. $P_i$ can be termed the issuing processor. There can be several types of free forks defined, depending upon the type of tasks. A fork can be visualized as a logical node wherein a given class of tasks is undertaken, such as, for example, an input/output fork wherein I/O tasks are to be performed; a digital data analyzer fork wherein DDA tasks are to be performed; an array processor fork, and so on. These are classes of forks which ask for help from processors of the type indicated. In general, any type processor can issue any type of fork. However, upon issuing a fork which is not the same type as the issuing processor, the issuing processor either saves its status in the FSW and aborts, reporting in to the control apparatus for assignment to another job; or it waits until the fork is completed and coordinates data. The decision of whether to abort or wait depends upon parameters such as priority requests, or other parameters of the designer's choice. In any event, the "unlike" issuing processor does not enter into and assist in processing the fork tasks, since it is of a different physical/logical (P/L) classification from the tasks in the fork. The control apparatus includes a resource table which lists the various types of system resources and keeps a record of their status as busy or free. An FSW queue is provided for each type of free fork instruction which may be encountered. Also included for each type of fork is an FSW register and control logic which controls operation of the tasks indicated in the FSW. Each FSW queue also has an FSW sub-queue and control logic to which control of a given FSW is transferred after operation of the parallel tasks reach a predetermined point, in order to free the FSW register and control logic to take a new FSW from the FSW queue.

Means are also provided for assigning processors to the tasks indicated in a given FSW on an as-available basis to allow optimum scheduling of system resources. Means are provided which indicate the address of previously issued free fork instructions to allow proper termination control when one or more of the tasks within a free fork itself contain a fork instruction. This is referred to as the fork within a fork situation. A given free fork instruction ends at a join point at which data from the completed tasks within a fork are to be coordinated. Apparatus within the invention gives the issuing processor a number of alternative actions in order to allow it to coordinate the data at this join point or, depending on length of the individual tasks within the fork, to go to another task or set of tasks and allow data to be coordinated by another processor in the system.

BRIEF DESCRIPTION OF THE DRAWINGS

FIG. 2A is a representation of the fork status word useful in the invention.

FIG. 2B shows the manner in which FIGS. 2B–A and 2B–B should be placed adjacent each other for a diagrammatic explanation of the operation of the invention.

FIG. 2C–2H show fork status words at various stages of control operation.

FIGS. 2K–2L show an example of operation of the subqueues of our invention.

FIG. 4A is an illustration of selection means useful in the control apparatus of FIGS. 3A and 3B.

DESCRIPTION OF PREFERRED EMBODIMENT

Figures 1A, 1B:
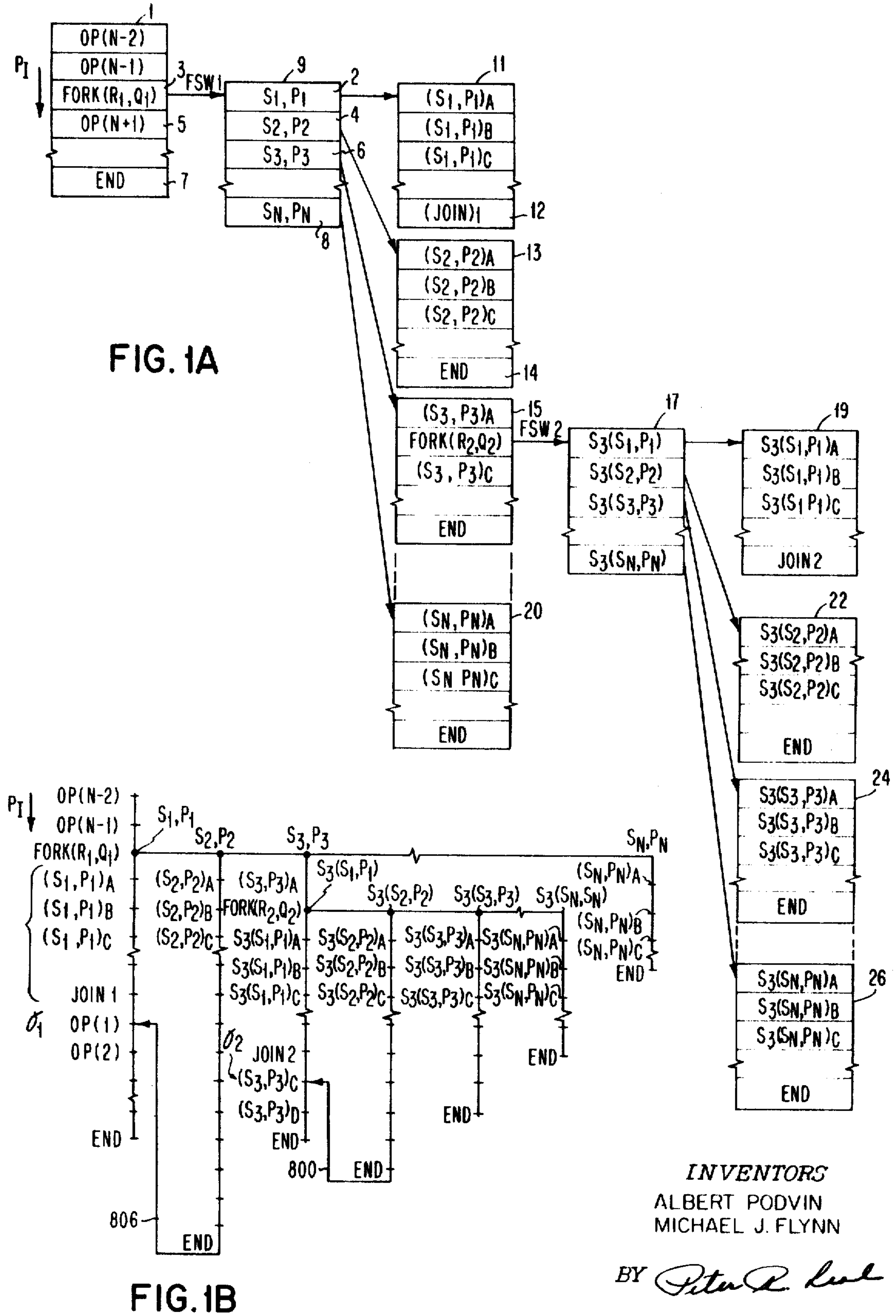
FIG. 1A is a representation of the manner in which free fork instructions may be issued, and it also indicates the manner in which tasks are indicated within a fork.
FIG. 1B is a conceptual representation of a free fork situation, showing a second free fork being issued within a first free fork.

With reference to FIG. 1A, there is seen a diagrammatic representation of the free fork instruction of the present invention. A given processor $P_f$ sequentially executes instructions in the group indicated at 1. A fork instruction 3 indicates that there are a number of tasks of a particular physical or logical (P/L) type, indicated by $R_1$, and that a fork status word (FSW) will be issued, the address of which will ultimately be part of the field indicated by $Q_1$. It will be seen that the instructions which $P_f$ is processing also have instructions after the fork, indicated generally at 5, and ultimately has an End instruction at 7. The instruction FORK $(R_1,Q_1)$ indicates a group of tasks indicated generally at 9. For example, S1 may be a pointer to the address of the first instruction of the first task, while P1 may be a pointer to the address of the parameters of the first task. The instructions of the first task of FORK $(R_1,Q_1)$ are seen generally at 11, ultimately ending with a Join instruction, a point at which all data from all tasks in FORK $(R_1,Q_1)$ should be coordinated. This first group of instructions may be performed by processor $P_f$, depending upon whether or not $P_f$ is of the same (P/L) type as that indicated by $R_1$, and also depending upon the status of the FSW queue with which the particular fork will be associated. This will be explained in detail subsequently.

Continuing, the task indicated by S2, P2 is seen generally at 13 and is completed at an End instruction 14. It will be noted that a first task in a group of parallel tasks in a fork will end at a Join while other tasks in the fork will end at an End instruction. The instructions of the third task, S3, P3 are seen at 15. In this group of instructions is seen, for illustrative purposes, a second fork instruction, FORK $(R_2,Q_2)$. The tasks for FORK $(R_2,Q_2)$ are seen generally at 17. The first task is seen at 19 and can be seen to end in a Join instruction as did the first task in FORK $(R_1,Q_1)$. All other tasks of FORK $(R_2,Q_2)$ will end in End instructions.

Referring to FIG. 1B, there is seen a conceptual representation of the forks in FIG. 1A. Processor $P_f$ is again processing instructions sequentially, as shown. The first FORK $(R_1,Q_1)$ is encountered. The instructions for the first task in the fork begin at $(S_1,P_1)_4$ and end at JOIN 1. The other tasks are as indicated. It is to be noted that task $S_3,P_3$, shown generally at 15 in FIG. 1A, can be clearly seen in FIG. 1B to include an internal fork, illustrating a fork within a fork situation. Therefore, the first task, namely 19, in that fork ends with a Join; and all other tasks end with an End instruction.

Referring to FIG. 2A, there is seen a typical FSW which is issued, upon encountering a fork in the instruction stream in a given processor, to the control apparatus to be described. The various fields of the FSW are as indicated below:

$N_1$—the number of tasks in the fork which are as yet undistributed $N_2$—the number of tasks in the fork which are distributed, but as yet incomplete S—a pointer to the address of the first instruction in the first task P—a pointer to the location of the first data parameter for the first task P/L—the (P/L) type of the tasks associated with the current FSW

*—an indication that the processor which issued the current fork has aborted or departed from the group of processors which are processing the tasks of this fork I—Indication that this FSW is the initial FSW (final FSW to complete operation) in this fork.

RETURN—The storage address of the next instruction after the Join instruction for a given fork.

$N_3$—the address of the current FSW in its particular queue $N_4$—the address of the FSW associated with the task which issued the current fork instruction.

$(P/L)_{f-1}$—the (P/L) type of the task which issued the current fork instruction.

I.D.—The identification code of the processor which issued this FSW.

Turning now to FIGS. 2B–A and 2B–B, placed adjacent each other as seen in FIG. 2B, there is seen a representation of a method embodiment of our invention. Starting at initial point 21, in FIG. 2B–A it is seen that a particular processor in a group of processors operating in parallel is decoding instructions, as indicated at 23. Special action takes place if the instruction is decoded as a Fork as indicated at 25, or as an End instruction as indicated at 27, or as a Join instruction as indicated at 29. If the instruction is not one of these three types, it is processed as indicated at 31; and line 33 indicates that the next instruction is decoded as at 23. What has been described is the basic processing operation of a processor, and there is one of these loops per captured processor operating in parallel. However, to preserve drawing clarity, only one is shown.

FORK INSTRUCTION

With continued reference to FIG. 2B–A, if a fork instruction is decoded, as indicated by line 35, then a group of parallel operable tasks has been encountered by the particular processor decoding the fork instruction. At this point a fork status word (FSW) similar to that described for FIG. 2A will be issued by the processor encountering the fork for the purpose of aiding in the control of the parallel tasks in the fork. Since there is a possibility of a fork within a fork, it is necessary to insert into the current FSW the address of the FSW from which the current FSW originated to serve as a means of returning to the original FSW at the termination of the current FSW. As seen at 41, the control apparatus then requests resources which are of the same (P/L) type as that designated by the decoded Fork instruction. The FSW queue, which stacks issued FSW's to await operation and which will be explained in detail subsequently, is tested at 43 to determine whether or not it is empty. If empty, as indicated at 45, the FSW queue is bypassed; and the FSW is entered directly into the FSW Register, from which control is undertaken, for immediate initiation of control operation.

If the FSW queue is not empty, it indicates that a previously issued FSW is currently being operated upon (this FSW is hereinafter referred to as the current FSW) and that the FSW being issued must be stacked in the FSW queue. If the processor from which the FSW issues can either wait for this and all previous FSW's to be completed, or can cause the * bit in the FSW to be set, and then abort leaving the data resulting from the processing of the tasks in the fork to be subsequently coordinated by another system processor.

Also, as a system processor becomes free, a test is made of the resource request mechanism for that processor type, to determine whether the processor is required for assisting in task processing. This is seen at 22. If it is, its busy bit is set and the processor becomes reserved for operation within the current fork.

Upon entering a fork, a given processor tests to determine whether all tasks indicated in the current FSW are distributed (i.e., whether N1 is zero). If N1 is zero, then all tasks have been distributed, the processor making the interrogation at 49 can report in free as indicated at 51, and the current FSW has had assigned to it all the processors that it can use. If all tasks are not distributed, N1 will be greater than zero; and the next task will be distributed to this interrogating processor as seen at 53. The interrogating processor will also decrement the N1 field so as to keep a running score of the yet undistributed tasks. This processor will also cause a second test of the N1 field, as in 55, to be made to determine whether all tasks are distributed after the distribution at 53. This test is made inasmuch as the particular task which has just been distributed may have been the last task; and if it was, it is necessary to perform one further operation. This can be explained as follows. It will be recalled in the explanation of the fields in the FSW of FIG. 2A that the first field, N1, indicates the number of tasks undistributed, while a second field, N2, indicates the number of tasks distributed but uncompleted. As can be appreciated by reference to FIG. 1B, some tasks in a fork require more time than others. Therefore, it is possible that all tasks may be distributed to various system processors, but there may be a considerable period of time before all tasks are completed. For example, in FIG. 1B the task indicated by $S_3,P_3$ will take considerably longer than any of the other tasks inasmuch as there is a second fork within that task. While awaiting these tasks to be completed, the FSW register is tied up; and there is no possibility of beginning the distribution of tasks in other FSW's to other processors in the system which may be available. Therefore, a sub-queue can be provided, as will be explained, for taking over the control of the operation of a given FSW once all tasks have been distributed. This frees the FSW Register of the control mechanism for distributing tasks to processors for new FSW's. Therefore, as noted by line 57, when all tasks are finally distributed the FSW is sent to the sub-queue as noted at 59. At this point, the FSW queue should be checked to see if it is empty, as at 61. If it is empty, as noted by line 63, this is an indication that all fork operation is complete, at least for the moment; and no more resources are needed. Therefore, as noted at 65, the request for other resources should be turned off. At this point, the processor which discovered at test 55 that all tasks have been distributed can begin operation on the task distributed to it at 53. This is indicated by line 71. On the other hand, if the test at 61 indicates that the FSW queue is not empty then the next FSW waiting in the FSW queue should be shifted down into the FSW Register so that operation can begin upon it, as indicated at 69.

END INSTRUCTION

On the other hand, if the present instruction decoded within a given processor is not a fork instruction, a test such as that at 27 of FIG. 2B–A is made to determine whether the current instruction is an End instruction. As can be seen from FIG. 1B, tasks end with an End instruction. With reference back to FIG. 2B–A, if the test at 27 discovers an End instruction it indicates that a distributed task has just been completed; then the N2 field of the FSW currently being operated upon, indicative of the number of distributed but uncompleted tasks, is decremented by one as indicated at 28. The N2 field is then tested to see if all tasks are complete as indicated by the test at 30. If all tests are not complete, as indicated by line 32, then action is not completed in the current fork. Furthermore, there is a possibility that not all tasks are yet distributed. To check this, the processor which has just completed its task tests the N1 field in the FSW to perform the test indicated at 49. If all tasks are distributed ($N1=0$), it means that even though all tasks have been distributed, operation on all tasks is not yet complete. Therefore, the processor which indicated an End instruction at test 27 can store its completed task information at a specified area of storage and report in free. This is indicated at 51. Its operation in this fork is then completed.

On the other hand, if the processor which decoded the End instruction determines by the tests at 30 that all tasks are complete, as indicated by line 34, then that processor has some further information to determine. To recapitulate, at this point the processor which detected the End instruction had determined that its task was the last task associated with a particular FSW, since test 30 indicated that all tasks are now complete. This processor (hereinafter referred to as the last processor out) must now determine status information relative to the processor which originally issued the FSW after decoding the fork instruction. The issuing processor had three alternatives, and the one of these which it has taken must be determined by the processor which determines that his task was the last task to be completed.

As indicated previously, a fork instruction ends at a join point. Generally, it can be stated that a join point is that point in a fork at which data from the parallel tasks of the fork are coordinated. When the processor $P_I$, performing the first task in a fork, reaches the join point, it tests to see if all tasks associated with the FSW are complete. That not all tasks will necessarily be complete when a processor reaches a Join point can be seen at JOIN 1 of FIG. 1B. It can be appreciated from that figure that, for example, when the processor which acquired task $S_1,P_1$ reaches JOIN 1, all tasks in FORk $(R_1,Q_1)$ will not be complete since the majority of other tasks are longer (and assumed longer in time) than $S_1,P_1$ and also since $S_3,P_3$ contains an internal fork, FORK $(R_2,Q_2)$, which also requires the capturing of processors for assignment to its tasks $S_3(S_1,P)$, $S_3(S_2,P_2)$,..., $S_3(S_N,P_N)$. If all tasks are not performed, $P_I$ has three alternatives. It can:

1. Become one of the fork processors and help out by taking on a task in one of the fork tines, other than the main stream which has just been completed by $P_I$.
2. Abort, under a priority interrupt, for example, and go to another job, leaving the data to be coordinated by the processor which determines that its End instruction completes all tasks. (Test 30, above).
3. Wait for all tasks to be completed and then coordinate data.

If $P_I$ takes options 1 or 2, it sets the * bit in the FSW and saves its status, as well as a specified location where all data can be coordinated, in the RETURN field of the FSW and leaves the fork. If $P_I$ takes option 3, the * bit will not be set; and the issuing processor will merely wait for all tasks to be completed.

The processor which determines at test 30 that all tasks are completed (last processor out) must determine whether the issuing processor has left the fork. This is done as indicated at test 36 of FIG. 2B–A and can be accomplished by testing the * bit in the FSW. If the issuing processor has not aborted, as indicated at line 38, this indicates that the issuing processor is waiting to coordinate data. In this case, the processor which successfully completed test 30 is no longer needed and can report in free as indicated in 51. On the other hand, if the issuing processor has aborted, as indicated by line 40; then it is up to the processor which successfully completed test 30 to coordinate the data. Therefore, as indicated at 42, the processor acquires the return address of $P_I$ from the FSW and may, at this point, coordinate data. Whether this processor in fact coordinates data depends upon whether or not this is the final FSW in a given group of forks.

For example, and referring to FIG. 1B, the processor which successfully completes test 30 may be at the End instruction of task $S_3(S_2,P_2)$. As noted from FIG. 1B, this is the longest task in FORK $(R_2,Q_2)$. Therefore, the processor is at a situation where it is the coordinating processor of a fork within a larger fork, namely FORK $(R_1,Q_1)$. If so, the FSW under operation is not the final FSW in this fork, inasmuch as there was a previous FSW issued as a result of an original processor decoding the FORK $(R_1,Q_1)$. Therefore, it is necessary for the processor under discussion to determine the address of the previous FSW so as to check the status of the tasks associated therewith and determine its future action. A test is made at 44 of FIG. 2B–A to determine whether the FSW presently under operation is the final FSW in the original fork. Indicated by the line at 46, the system coordinates the fork data resulting from operation on the tasks associated with the current FSW and accesses the issuing FSW.

The issuing FSW is again interrogated as indicated at 30 to determine whether all tasks are complete. If all tasks are not complete, as indicated by line 32, the processor performs test 49, inasmuch as there may also be undistributed tasks in the issuing fork. If all tasks at test 49 are distributed, the processor is free, inasmuch as there are still tasks under operation in the issuing fork; and no further system resources are needed since all tasks were distributed as seen in test 49. Therefore, the processor stores its completed task information and reports in free and is complete. Data will be coordinated by a processor at the completion of this accessed FSW. If all tasks are not distributed, the processor takes on one of the tasks as indicated in 53 and continues as a system processor operating within the purview of the accessed FSW which in this case is the issuing FSW.

On the other hand, if test 30 indicates that all tests associated with the issuing FSW are complete, the processor then performs test 36 again and continues as before. If the processor does not end up taking line 32, it will ultimately either report in free via line 38 or complete the entire job of the fork via test as indicated at 54.

JOIN INSTRUCTION

If test 27 of FIG. 2B–A indicates that the current instruction is not an End instruction, then a test is performed as indicated at 29 to determine whether or not the instruction is a Join instruction. If it is, as seen at line 56, it indicates that the processor decoding the join instruction has arrived at the point at which data from the operation upon all tasks in the fork is to be coordinated. For example, and referring to FIG. 1B, instruction JOIN 2 indicates the point in FORK $(R_2,Q_2)$ at which the information resulting from tasks $S_3(S_1,P_1)$, $S_3(S_2,P_2)$, $S_3(S_3,P_3)$,..., $S_3(S_N,P_N)$ are to be coordinated. However, as seen in the referenced figure, it may be that one or more of the tasks are longer in execution time than the task ending at the JOIN 2 instruction. Therefore, it is necessary for the processor arriving at the Join instruction to check to see whether all tasks within the associated FSW are complete. This is indicated at test 58 of FIG. 2B–B. If all tasks are not complete, line 60, it may be that this processor will not have time to wait for their completion, but rather is required to abort because of priority interrupt, for example. This is indicated by the test at 62. If the processor is required to go elsewhere in the system, it sets the * bit in the FSW and aborts. If it is not required to abort, as indicated at line 64, test 58 is attempted again. If it turns out that all tasks associated with this FSW are complete, then a test such as 66 is made to determine if this is the final FSW in the original fork. If it is, as indicated at line 68, the processor completes the job as indicated at 54 by coordinating all data and continuing along the path of its original program. If this is not the final FSW, as indicated at 70, then the processor will continue processing instructions in its task until it reaches an End instruction. With reference back to FIG. 1B, this would be the situation where the instruction JOIN 2 has been encountered; and the processor then continues processing instructions $(S_3,P_3)_C$ and so on until the End instruction of $S_3,P_3$. When the End instruction is decoded, as indicated by line 74 from test 72, the processor coordinates data resulting from this particular fork and accesses the issuing FSW. At this point, and referring back to FIG. 1B, the system would be accessing the FSW which was the issuing FSW of the FSW interrogated in test 66. That is, it would be accessing the FSW issued relative to the FORK $(R_1,Q_1)$. Having accessed the issuing FSW, which may still be controlling tasks associated with the first fork, test 78 is performed to determine whether all tasks in the issuing FSW are complete. If they are not complete, as indicated by line 80, then it may be that there are yet undistributed tasks remaining in the fork associated with this FSW. Therefore, as indicated by line 80, test 49 is performed to see if all tasks in this issuing FSW are distributed. If yes, there is no further need for this processor; and, as indicated at 51, it reports in free and is complete. If all tasks are not distributed in test 49, then the next task is distributed to this processor as indicated at 53; and the processor becomes one of the assisting resources for the issuing fork.

On the other hand, if the test at 78 indicates that all tasks associated with the issuing FSW are complete, then, as seen at line 82, the processor acquires the return address from the FSW and completes the job. Completing the job in this case entails performing instructions $(S_1,P_1)_A$,..., down to JOIN 1, where all data from both forks in the present example will be coordinated and then continuing down the path to the final End instruction at which point the operation is complete. When encountering JOIN 1, according to the present example, a situation will arise similar to that at test 29 of FIG. 2B–A; but since we are assuming all tasks are complete, and that this is the final FSW in the original fork, the tests 58 and 66 will result in job completion 54 via line 68.

STRUCTURE

Where possible, apparatus corresponding to various points of operation of the method embodiment of FIGS. 2B–A and 2B–B will be given reference numerals corresponding to those of FIG. 2B, with the inclusion of a distinguishing literal, for ease of correlating FIGS. 2B–A and 2B–B with the apparatus figures. For example, apparatus performing a method step indicated as 44 in FIG. 2B–A will be given the reference numeral 44*a*, and so on.

Figure 5:
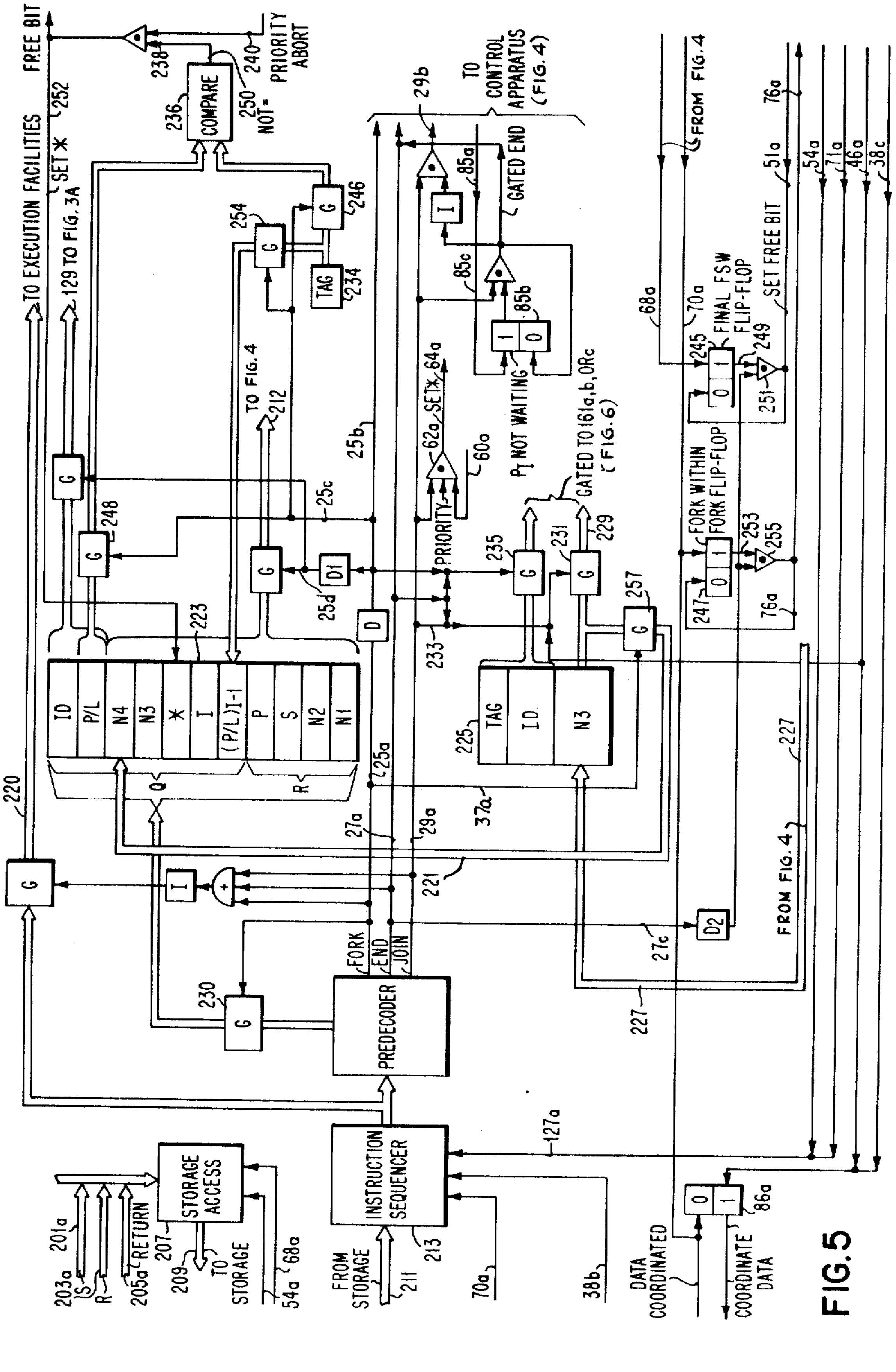
FIG. 5 is an illustration of one of the several resources within the parallel processing system.

Referring to FIG. 5, there is seen one type of digital processor which can find use as a system resource in our invention, and which can be dedicated to a certain (P/L) function. This processor is similar to the ones described in the above-referenced, copending application, with modification to be explained here. It will be recognized that, when used in groups of arrays of processors, as in the copending patent application cited above, a tie-breaking apparatus similar to that described in that patent application may be necessary to insure that no conflicts arise when more than one of the to-be-described processors are working against the control apparatus to be described subsequently with respect to FIGS. 3A and 3B.

Referring to FIG. 5, there are seen Buses 201*a*, 203*a*, and 205*a* for receiving control information from the current FSW in the control apparatus of our invention. This information is sent to Storage Access Means 207, which may include storage, and which accesses system storage via Bus 209. System storage, not shown, may be a common storage means for all processors in the system. Operands are received from storage via Bus 211 to Instruction Sequencer 213. The Instruction Sequencer sequences instructions to predecoder 215. Predecoder 215 determines whether a particular instruction is a Fork, an End, or a Join instruction, as indicated respectively by lines 25*a*, 27*a*, 29*a*, which are connected to the control apparatus of FIG. 4. If it is a fork instruction, the instruction, or an appropriate part of it, is gated to register 223 to be used as an FSW for this fork. Concurrently, line 27*a* informs the control apparatus that a fork has been detected. Lines 27*a* and 29*a* are connected from each processor through suitable priority means to the control apparatus to inform that unit that an End instruction or a Join instruction has been encountered, respectively. These lines can be used to inhibit an End instruction or a Join instruction from being transmitted over Bus 220, inasmuch as a Fork, End or Join instruction does not actually call for shared processing execution facilities as do other instructions. In the event that the instruction is neither a Fork, End or Join, it is therefore assumed to be another type of data processing instruction and is transmitted over Bus 220 to shared execution facilities in a manner similar to that explained for the above cited copending patent application. Processor register 225 contains a field, N3, which identifies the address of the FSW associated with the particular task being processed by the processor at a given time. This field of register 225 is settable via Bus 227 from the FSW register and control apparatus of FIG. 4. As will be made more clear subsequently, a particular processor, after acquiring a task within a given fork, will disconnect and execute the task independently of control by the FSW register and control apparatus. When the particular processor detects an End or a Join instruction, it is necessary to return to the FSW associated with the fork within which this task belongs. Thus, N3 is carried with the processor while it is executing a task so that at the appropriate time the processor can access the FSW indicated by N3 to allow appropriate control action to be taken. This accessing is done by gating N3 over Bus 229 via gate 231, the gating pulse being supplied over line 233. Line 233 is activated by the End or Join control lines 27a, 29a. Concurrently, these lines also activate gate 235 to gate the I.D. of the particular processor to the control apparatus over Bus 237. The I.D. may be wired in and serves to identify the particular processor which is accessing a given FSW so that the control apparatus has a means, namely the I.D. code, of gating back appropriate control information to the requesting processor. As can be seen from FIG. 5, register 223 contains the FSW. The N4 field, which is the address of the FSW which issued the FSW in 223 is actually the N3 field of the current FSW from register 225 by way of gate 257. The (P/L) designation is part of the FSW as issued from the instruction sequencer. The I.D. portion can be wired in and is the I.D. number of the processor. Tag register 234 contains the (P/L) designation of the processor. The contents of the tag register are connected via gate 246 to comparator 236. The (P/L) designation in the FSW is connected to the same comparator through gate 248. If the (P/L) designation of the processor, as contained in the tag register 234, is not the same as the (P/L) designation of the FSW as contained in register 223, then the not-equal line 250 will be active. If the designations are not the same, then the current processor cannot participate in the execution of the tasks in the fork. Therefore, if priority abort line 240 is active, then line 252 will set the * bit in the FSW and set the free bit for this processor; and the processor will abort. On the other hand, if the priority abort line 240 is not active at this time, the * bit and the free bit will not be set; and the processor will merely wait until all tasks in this fork are finished, in order to coordinate data. Further, the tag from register 234 is gated through gate 254 to be set into the FSW as $(P/L)_{i-1}$, which identifies this (P/L) designation as the designation of the fork which issued the fork in 223. This will be useful in control operation to be described subsequently with respect to FIGS. *3a*, *3b*, 4 and 6.

Line 25d, through suitable delay means $D_1$ will ultimately gate the complete FSW via Bus 212 to data control apparatus. Delay D1 is chosen to allow the comparisons and data transfer within the just-described register 223 to take place before the FSW is gated to the control apparatus.

Fork-within-fork flip-flop 247 is also provided. Line 70a from the control apparatus is connected to the one side of the flip-flop. When activated, line 70a indicates that the fork which has just been completed in not the final fork within the original fork and that the apparatus has discovered a fork-within-fork situation. Line 70a will have seen activated from the control apparatus in response to the activation of line 27a which indicated that the processor has just completed a task. The activation of line 70a therefore indicates that the completed task has just completed a fork, but that the fork is not the final fork. Therefore, line 70a indicates that the control apparatus has determined a fork-within-fork situation. Line 70a is also connected to line 127a to allow the instruction sequencer to begin processing instructions after the End instruction, which initiated the control resulting in the activation of line 70a. As will become more apparent subsequently, the activation of line 70a occurs concurrently with the gating to the processor of another storage address which transfers the processor to operation within the fork which issued the fork which has just been completed. Therefor, the activation of line 127a will initiate the sequencing of instructions associated with this issuing fork. On the other hand, final FSW flip-flop 245 is provided. Line 68a, from the control apparatus, is connected to the one side of flip-flop 245. When activated, line 68a indicates that the End instruction which this processor has just decoded completes a fork, which indeed is the final fork in the total fork.

The one side of flip-flop 247 is connected via line 253 to AND gate 255. Line 27c is connected via suitable delay $D_2$ as a second input to AND gates 251 and 255. The delay $D_2$ is selected to enable the signal from line 27a to reach the control apparatus and the return signal to be transmitted via lines 68a or 70a, if such is the case to set the appropriate flip-flops. The signal over line 27c will then gate the output of AND gates 255 and 251. If there is a fork within a fork situation, the output of AND gate 255 over line 76a will be sent to the select apparatus of FIG. 6 to select the new FSW for operation; and, concurrently, flip-flop 247 will be set to its zero state to await the next fork-within-fork situation. On the other hand, if flip-flop 245 is set to a one state, line 27c will activate AND gate 251 to set the free bit over line 51a for this processor, inasmuch as this processor is now finished with its operation. Concurrently, flip-flop 245 will be set to its zero state.

CONTROL APPARATUS

Figure 3B:
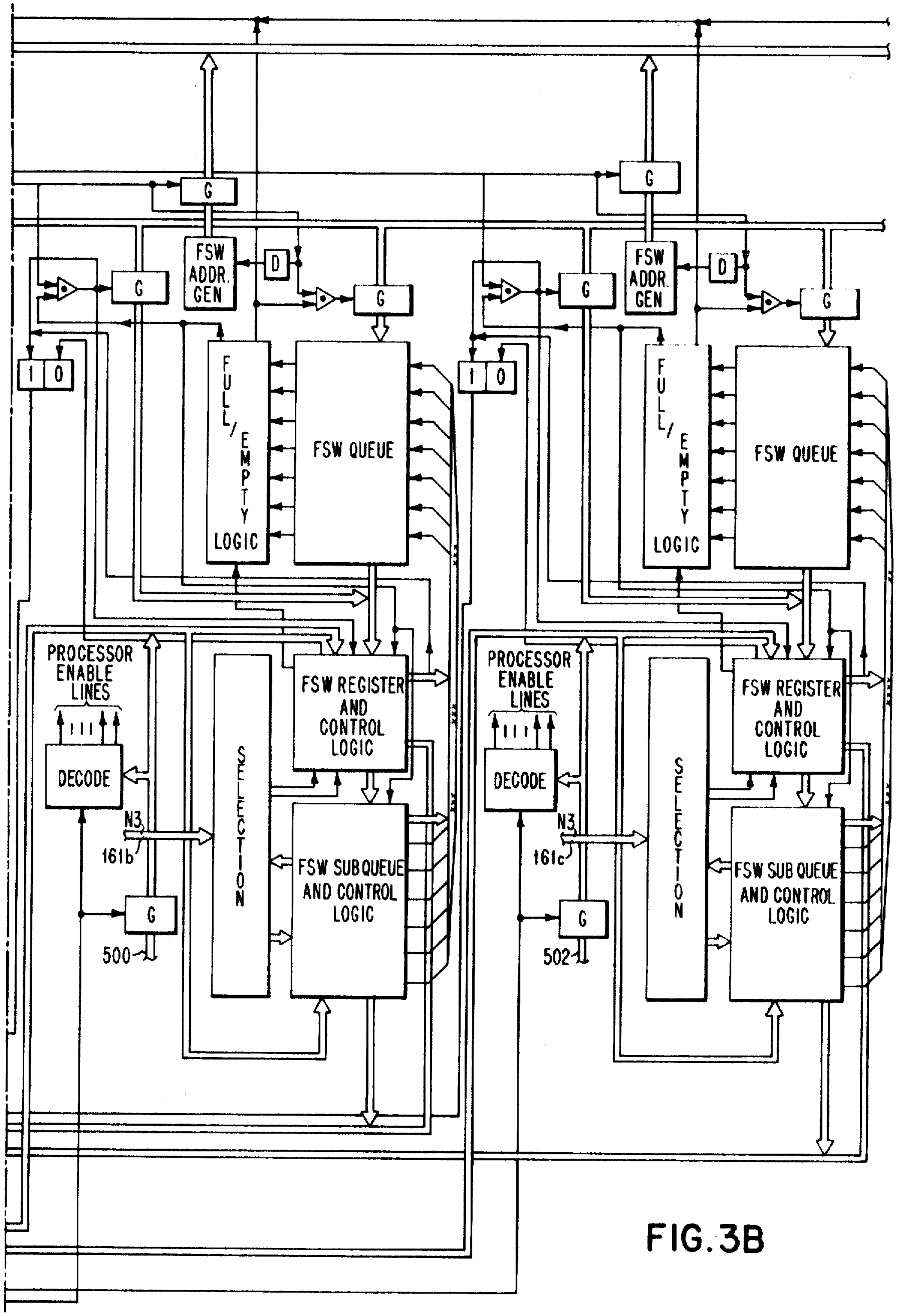
FIG. 3A and 3B show an illustration of the control apparatus of our invention.
Figures 3, 3A:
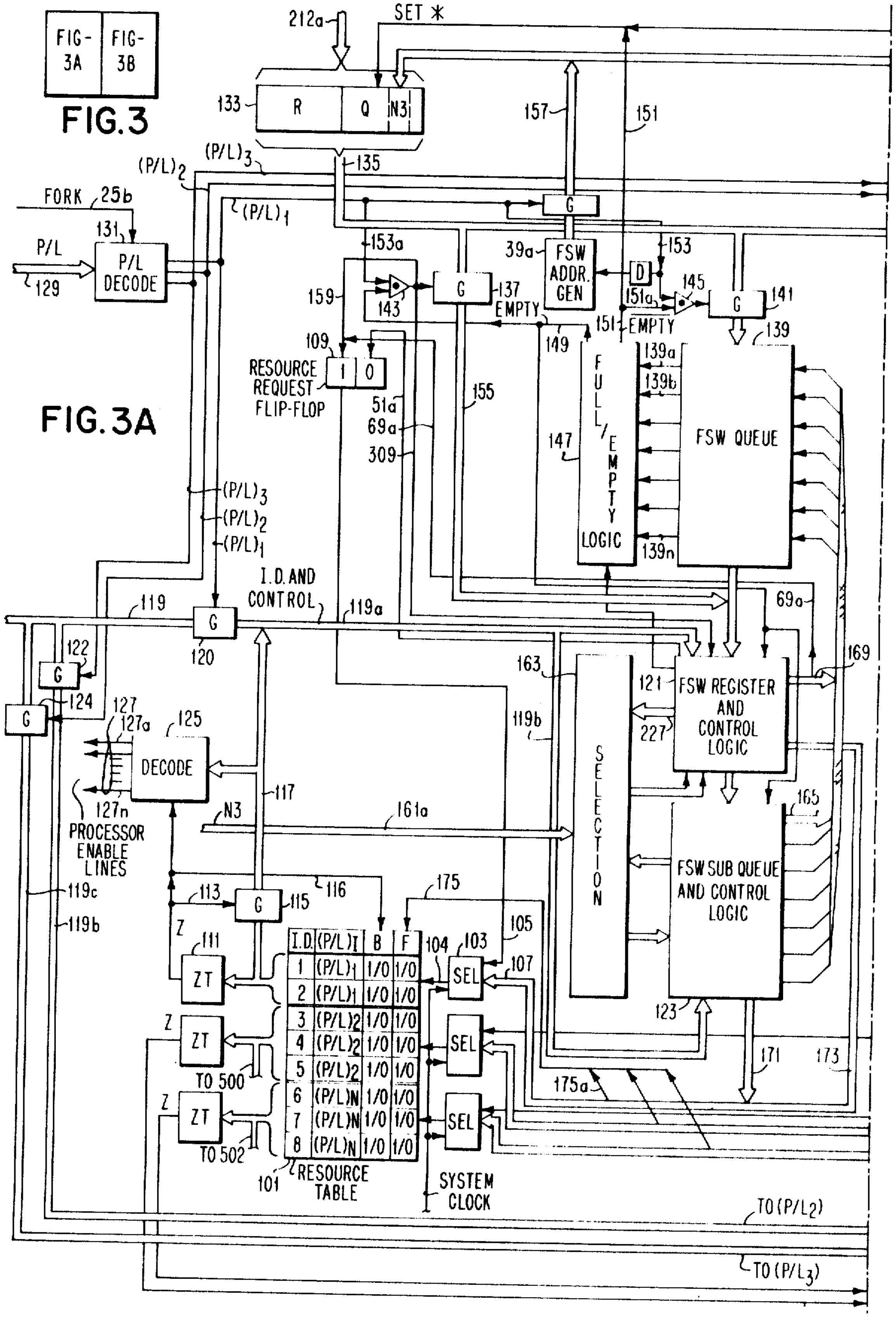
FIG. 3 shows the manner in which FIGS. 3A and 3B should be placed adjacent to each other for ease of understanding.

Referring to FIGS. 3A and 3B, placed adjacent each other as seen in FIG. 3, there is seen an embodiment of the control apparatus of our invention.

Seen in FIG. 3A is resource table 101. Resource table 101 may be any type of well-known addressable storage which lists processors in physical/logical (P/L) groupings and by processor I.D. numbers. Each category is addressable by a selection means such as 103 actuated by line 105 to select addresses cyclically or to select the address presented over Bus 107. Line 105 is connected from the one state side of Resource Request flip-flop 109. Resource Request flip-flop 109 is associated with physical/logical class $(P/L)_1$ and, therefore, activates select 103 associated with class $(P/L)_1$ of resource table 101. As can be seen, each processor in a given class has a busy bit B and free bit F. If in cyclic operation, selection means 103 cyclically selects each processor in a given class and tests its busy bit in zero test apparatus 111. If the busy bit is zero, it means that the processor is not busy; and line 113 enables gate 115 to send a processor I.D. over Bus 117 to I.D. and Control Bus 119 to the FSW register and control logic 121 and FSW sub-queue and control logic 123 where it is assigned a task according to the operation which was described above generally and will be described subsequently in detail. Concurrently, line 116 sets the busy bit for that processor to a one condition indicating that it is now preempted to perform a task within a fork. Also, concurrently, the processor I.D. is gated to decode means 125, the output of which is a processor enable line to the particular processor indicated in the I.D. This line in the particular processor enables the accessing of storage in accordance with the storage address as sent over Buses 201a, 203a and 205a, as was seen in FIG. 5 and also enables the instruction sequencer to begin processing task instructions which arrive from storage over Bus 211 of that figure.

With reference to FIG. 4A, there is seen a diagram of one of the select mechanisms such as that seen at 103 in FIG. 3A. As seen in FIG. 4A, the system clock line, also seen in FIG. 3A, is connected to ring counter 106 which has length equal to the number of positions in its associated P/L classification in the resource table. Line 105, also seen in FIG. 3A as coming from the one state of resource request flip-flop 109, acts as an enabling line to enable the ring counter 106 to advance by one each time a system clock pulse is received. The position of the ring counter is transmitted over Bus 108 to decoder 110 which decodes the selected resource table location and accesses that position over line 104. There will be an access line for each position, only one being shown here. Also, if it is desired to select a particular processor, as opposed to cyclic selection, Bus 107 transmits an address to the access directly, and, therefore, contains a disable line which disables the ring counter so that no address is presented over Bus 108, and, instead, the directly accessed address is presented over 107 to the decoder to access the resource table location. When there are no signals over Bus 107, the disable line is deactivated; and the ring counter advance is controlled by the condition of enable line 105. Thus, normally, resource request flip-flop 109 activates line 105, the positions of the associated (P/L) classification in the resource table are cyclically scanned to capture available processors for the tasks at hand at a given fork. Overriding this, if a particular address is to be accessed in order to enable a processor which has been performing the task to report in free, Bus 107 is active; and the disable line overrides the ring counter for the moment to allow the processor designated in to access the resource table and set its free bit.

Returning now to FIGS. 3A and 3B, there is seen (P/L) Bus 129 which is connected to (P/L) decoder 131. Bus 119 receives the I.D. field and appropriate control lines from the individual processors reporting into the control apparatus. Bus 119 is gated via gates 120, 122 and 124 to Buses 119*a*, 119*b*, and 119*c* to the control apparatus for classifications $(P/L)_1$, $(P/L)_2$, $(P/L)_3$, respectively, as indicated by the decoding of the processor P/L type by decoder 131. Decoder 131 is enabled by a signal on line 25*b* indicating that the processor transmitting its (P/L) type over Bus 129 has encountered a fork instruction and is gating its FSW to register 133 via Bus 212*a*. The subsequent discussion is in terms of logic for the $(P/L)_1$ classification, but pertains, as well to any other (P/L) designation. There is seen in FIG. 3A, FSW queue 139 connected via a bus to FSW register and control logic 121. FSW register and control logic 121 is connected to FSW sub-queue and control logic 123. Both of the above two entities are also connected to selection means 163 which, upon presentation of a given N3 address, selects the register containing the FSW indicated by that N3 address.

The FSW in register 133 can be gated via Bus 135 either directly to the FSW register and control logic 121 of the $(P/L)_1$ portion of the control apparatus through gate 137, if the FSW queue 139 is empty (i.e., if there are no other FSW's waiting for operation); or on the other hand, if the FSW queue is not empty, the FSW in register 133 is gated to the FSW queue via gate 141. This is assuming that the processor operation required for the current fork is $(P/L)_1$. If processor action required is other than $(P/L)_1$, then FSW is gated to the appropriate (P/L) section by gating circuitry similar to that presently described.

With continued reference to FIGS. 3A and 3B, FSW queue 139 can be a stack of pushdown storage registers, each having connection 139A, 139B,..., 139N to full/empty logic 147. Full/empty logic 147 may be, for example, a negative AND function of all input lines yielding a signal over line 149 when no registers of the FSW queue are occupied, and yielding a signal over line 151 when at least one such register contains an FSW. Thus, when the not-empty line is activated, and the service required is $(P/L)_1$, both lines 151*a* and line 153 will enable AND-gate 145 to gate the FSW into the FSW queue via gate 141. It will be noted that line 39*b* is connected to FSW address generator 39*a*, which, in turn, transmits its current value over Bus 157 to the N3 field of the FSW to be used as the address of that FSW. FSW address generator 39*a* may be, for example, a ring counter which is advanced each time a pulse appears on line 39*b*. Sufficient delay should be added to line 39*b* to enable the FSW address generator to be advanced after the transmission of the address over Bus 157 to the N3 field of the FSW. Thus, if the FSW address generator is reset to zero at the beginning of each fork, the address of the first FSW will be zero and each subsequent FSW will have an address incremented by one from its successor.

Whenever an FSW is gated into the FSW register and control logic 121, from which its operation is controlled, it is necessary to set the Resource Request flip-flop 109 to its one state in order to begin requesting resources of the appropriate (P/L) type from resource table 101. FSW's are entered into FSW register and control logic 121, either by being shifted down from the FSW queue or being gated via Bus 155 if the FSW queue is empty. Therefore, the gating pulse from line 159 or the shift pulse from line 69*a* is connected to set the Resource Request flip-flop 109 to its one state. This flip-flop is set to its zero state by line 59*a* which is connected from the FSW register and control logic 129 and which, when activated indicates that all tasks have been distributed and that no more processors are required for this FSW.

Line 151 is also connected to set the * bit in the FSW in register 133 to a one state when an FSW for a particular (P/L) is to be inserted in the FSW queue, rather than directly into FSW register and control logic 121. This is because of the fact that the issuing processor when placing the FSW into FSW queue 139 will not necessarily be assigned to the first task in that queue as it would have been had the FSW bypassed the FSW queue and was placed in register 121 for direct operation. Therefore, the issuing processor has effectively aborted, as indicated by * bit in the FSW, and may ultimately become one of the processors helping out in the fork, but will not necessarily be the issuing processor and will not necessarily coordinate data at the end of the fork.

FSW sub-queue and control logic 123 is a group of registers operating as a pushdown stack, similar to FSW queue 139. The registers in FSW sub-queue and control logic 123 have the same format as the FSW register and control logic 121, both of which will be described in detail subsequently. The function of sub-queue and control logic 123 is to receive the FSW from FSW register and control logic 121 after all tasks have been distributed, that is, after N1 has been decremented to zero. The reason for this is that all tasks will probably not be completed by the time all tasks are distributed. Therefore, FSW sub-queue and control logic will control the completion of the tasks associated with a given FSW while the next FSW from the FSW queue will be shifted down into FSW register and control logic 121 to allow immediate initiation of distribution of processors to this next FSW, even though all tasks in the previous FSW are not yet complete.

When a particular processor is executing a task, it will receive a pointer to both the address of the first instruction of the task and the address of the first data parameter of the task from the FSW register and control logic 121 and will disconnect to execute the task.

In order for a disconnected processor to access the appropriate FSW after completing the task, Bus 161 is provided which carries the N3 field from the accessing processor to selection means 163. Selection means 163 accesses the desired FSW which may be in FSW register and control logic 121, wherein distribution of its tasks is being controlled, or may be in one of the registers in FSW sub-queue and control logic 123, wherein the completion of the distributed tasks associated with the given FSW is being controlled. After completion of a given FSW, a signal is sent along Bus 169 to shift down each register in both the FSW sub-queue and control logic 123 and the FSW queue 139 when operation of a given FSW is complete, so that the next FSW can be started in the FSW register and control logic 121. When a processor reporting in to its given FSW is found no longer to be required, its I.D. is sent along a bus such as 171 or 173, for a given (P/L) class to a bus such as 107, from which its position in resource table 101 is accessed and its free bit is set, indicating that the processor is free for assignment to another task. The free bit can be set, for example, by a line such as 175, which is activated from the control line such as 175*a* from the appropriate transmission bus for the appropriate (P/L) class.

TASK DISTRIBUTION AND CONTROL APPARATUS

Figure 4:
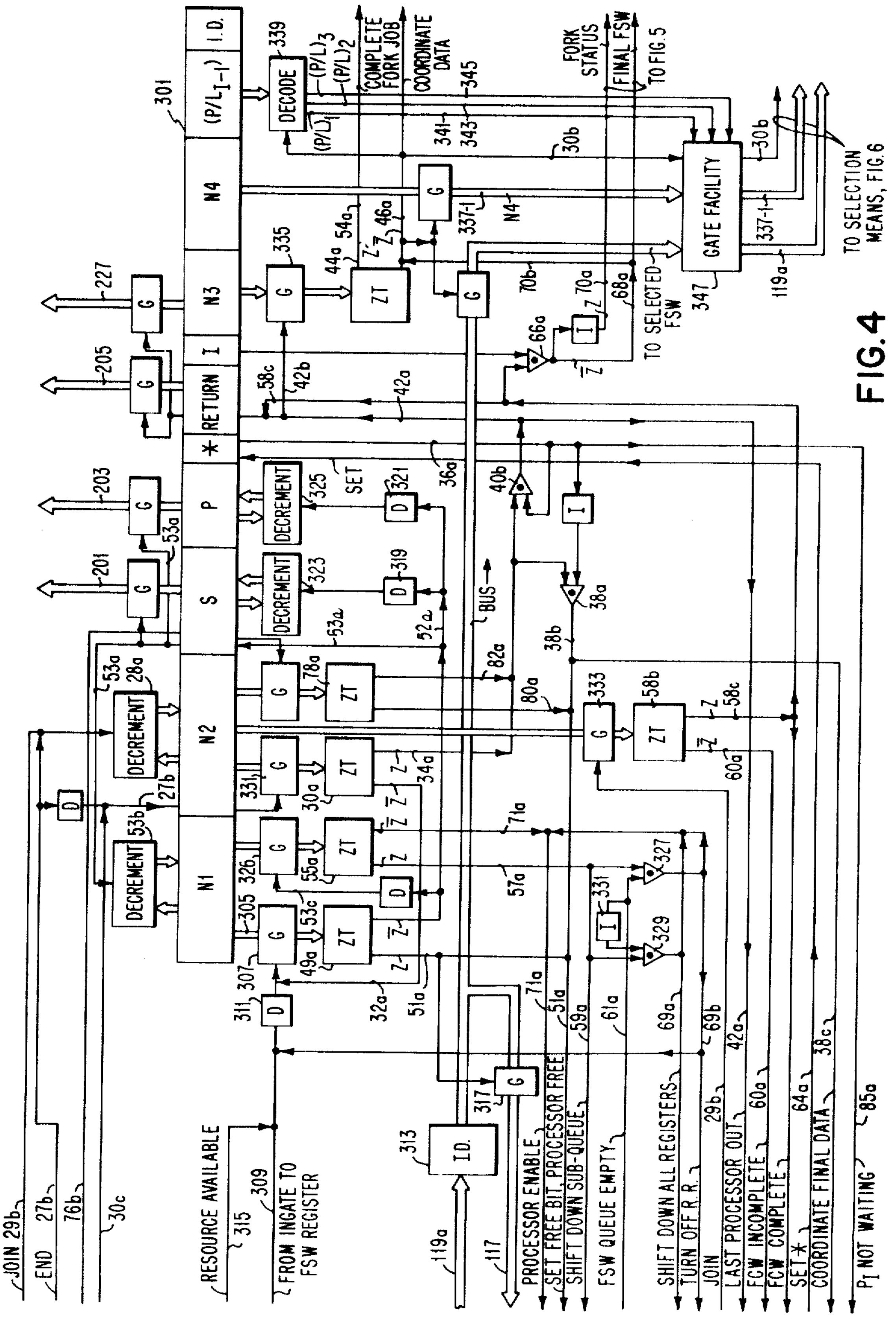
FIG. 4 is a detailed illustration of the FSW register and control logic shown generally in FIG. 3.

Turning now to FIG. 4, there is seen the FSW register and control logic which was seen generally at 121 in FIG. 3A. As will become apparent, a group of this same type apparatus connected together as a pushdown stack will comprise the FSW sub-queue and control logic seen generally at 123 in FIG. 3A. Continuing with FIG. 4, there is seen register 301 which is of length suitable for storing an FSW. The N1 field of register 301 is connected to zero test apparatus 49*a* by Bus 305 via gate 307. Line 309 is connected, via delay 311 to enable gate 307 to pass the N1 field to the zero tester. Line 309 comes from the in gate to the FSW register and control logic, seen in FIG. 3A. The function of line 309 is to begin operation on a particular FSW if it is gated directly to the FSW register by bypassing the FSW queue 139. At this point in time, the I.D. of the issuing processor will have passed over Bus 119 and be stored in I.D. register 313. Also, if the control apparatus is requesting resources, as was explained with reference to resource request flip-flop 109 in FIG. 3A, then when a resource becomes available line 315 will also be connected through delay 311 to distribute the task to the available processor, whose I.D. will be in register 313.

If the value of N1 is zero (indicating all tasks have been distributed), line 51*a* will set the free bit for the particular processor, the I.D. of the processor being gated over Bus 171 to suitable selection means, such as 103 of FIG. 3A, to set the proper free bit in the resource table 101 of FIG. 3A. The nonzero line, 53*a*, of zero test apparatus 49*a* is connected to gate the current S field and P field over Buses 201 and 203 to the accessing processor, in order to supply it with a pointer to the first task instruction address and the first task parameter address. After a suitable delay, as indicated at 319, 321, line 52*a* causes decrementing apparatus 323 and 325 to decrement the S and P pointers by one. Similarly, the N1 field is gated via gate 326 to zero test apparatus 55*a*. The nonzero output of zero test apparatus 55*a* is connected via line 71*a* to enable the accessing processor to begin the task indicated by the above pointers. The zero output of zero test apparatus 55 *a* is connected via line 57*a* to line 59*a* which acts as a gating line to shift down each register in the FSW sub-queue. Line 57*a* is also connected as an enabling input to AND-gates 327 and 329. Line 61*a*, indicating that the FSW queue is empty, is connected as the other input to AND 327 and also through inverter 331 as the other input to AND 329. The output of AND 329 is connected to line 69*a*, and when activated, indicates that the last task in the FSW has been distributed and also that the FSW queue is not empty so that the FSW queue is shifted down one position to allow a new FSW to be shifted into the FSW register 301 to begin operation. Also, the output of AND 329 is connected to line 71*a* to enable the accessing processor to begin processing the tasks assigned to it.

Line 61*a* is also connected as an input, along with line 57*a*, to AND 327. When both inputs are active, it indicates that all tasks have been distributed ($N1=0$) and the FSW queue is empty so that there is no FSW awaiting distribution of tasks. Therefore, line 69*b* which is connected to set the zero side of flip-flop 109 in FIG. 3A turns off the request for resources.

TASK END CONTROL APPARATUS

With continued reference to FIG. 4, there is seen line 27*b* which is activated by the accessing processor, which has detected an END instruction in its task. Line 27*b* is connected to enable decrement device 28*a* to decrement the N2 field of the FSW. After a suitable delay, line 27*b* also activates gate 331 to transmit the N2 field to zero test apparatus 30*a*. The not-zero side of zero test apparatus 30*a* is connected via line 32*a* to the enabling line of gate 305. The zero side of zero test apparatus 30*a* is connected via line 34*a* to AND-gates 38*a* and 40*b*. Line 36*a* from the * position of the FSW is connected as a second input to AND 40*b*, while the inverse of line 36*a* is connected as a second input to AND 38*a*. The output of AND gate 38*a* is connected via line 38*b* to line 50*a*. When this output is activated, it means that the N2 field is zero and, therefore, all tasks are complete; and the * bit is not zero, so that the issuing processor has not aborted but is waiting to coordinate data at the end of the fork. Therefore, line 51*a* sets the free bit of the processor, and the processor becomes available for subsequent task distribution elsewhere. On the other hand, if the * bit is on, it indicates that the issuing processor has aborted and the accessing processor which has just finished its task must obtain the return address of the issuing processor and coordinate data. Thus, line 42*a* gates the return address over line 205 and also indicates to the processor that it is the "last processor out." Concurrently, line 42*b* gates the N3 field to zero test apparatus 44*a* to test whether of not this is the final FSW in the fork. The zero side of zero test apparatus 44*a* is connected via line 54*a* as an indication to the accessing processor that it has just completed the final FSW in the fork and should complete the fork by coordinating data and continuing down the original program stream of the issuing processor. The nonzero side of zero test apparatus 44*a* is connected via line 46*a* to gate the processor I.D. and the N4 field to the selection means of FIG. 6. N4 will there be decoded to access the issuing FSW to determine what further control action must be taken. Concurrently, line 46*a* is also connected to line 30*b* which interrogates the newly accessed FSW. This is done as follows. Line 46*a* cause decoder 339 to decode the $(P/L)_{I-1}$ field to yield an indication of the P/L type of the issuing FSW. This will be used to steer the address N4 of the issuing FSW to the FSW Register and Sub-Queue of the proper (P/L) classification. This is done by the appropriate one of lines 341, 343, 345 gating the I.D. over 119*a*, N4 over 337–1 and line 30*b* to the proper selection means by gate facility 347. Line 30*b* can be decoded along with the N4 field in the selection means, to be described subsequently with regard to FIG. 6 and then gated to the proper sub-queue register containing the FSW. When gated to the proper sub-queue register, it appears as line 30C, seen in the upper left-hand side of FIG. 4, to begin control action on the issuing FSW.

JOIN CONTROL APPARATUS

When a Join instruction is encountered by a processor, line 29*b* in FIG. 5 is activated. This line is gated by suitable gating means to the control apparatus in FIG. 4 and is seen as line 29*b* connected to gate 333. Gate 333, when enabled, allows the N2 field to be transmitted to the zero test apparatus 58*b*. The zero side of zero test 58*b* is connected via line 58*c* to gate 335 which gates the I-bit to AND 66*a*. The I-bit is settable by the system monitor; and if it is set to a one, it identifies the final FSW (from a processing view point). If I is a one, it means that the accessing processor has just finished the last task of the final FSW of the original fork, and line 68*a* is then sent to the processor seen in FIG. 5A to set Final FSW Flip-flop 245 to its one state and to activate the instruction sequencer. On the other hand, if this is not the final FSW, line 70*a* is transmitted to the processor of FIG. 5 to set the Fork-Within-Fork Flip-Flop 247 to its one state and also activate the instruction sequencer. Concurrently, line 58*c* serves to gate the return address to the issuing processor over line 205. After a Join instruction is detected, either line 68*a* or 70*a* is activated; and the instruction sequencer begins the processing of instructions starting with the next instruction after the Join instruction. When the End after the Join instruction is detected, the processor will either be free (if line 68*a* was active, indicating that the final FSW had been completed) or the processor will access the next FSW over line 76*a* (since the processor is in a fork-within-fork situation and must bootstrap to the issuing FSW in order to complete operation).

Continuing with FIG. 4, line 76*b* emanating from the processor of FIG. 5 is connected via suitable gating means to access the issuing FSW to gate the N2 field of register 301 to zero test apparatus 78*a*. The zero output of 78*a* is connected via line 82*a* as one enabling input to AND 38*a* and AND 40*b* for the same reason as line 34*a* was connected thereto. That is, activation of line 82*a* indicates that all tasks have been completed; and the AND gates 38*a* and 40*b* test whether or not the issuing processor has aborted. The nonzero output of zero test 78*a* is connected to line 80*a* which, in turn, sets the free bit for the accessing processor so that it is free to be assigned now to other tasks.

FSW SUB-QUEUE AND CONTROL LOGIC

Figure 6:
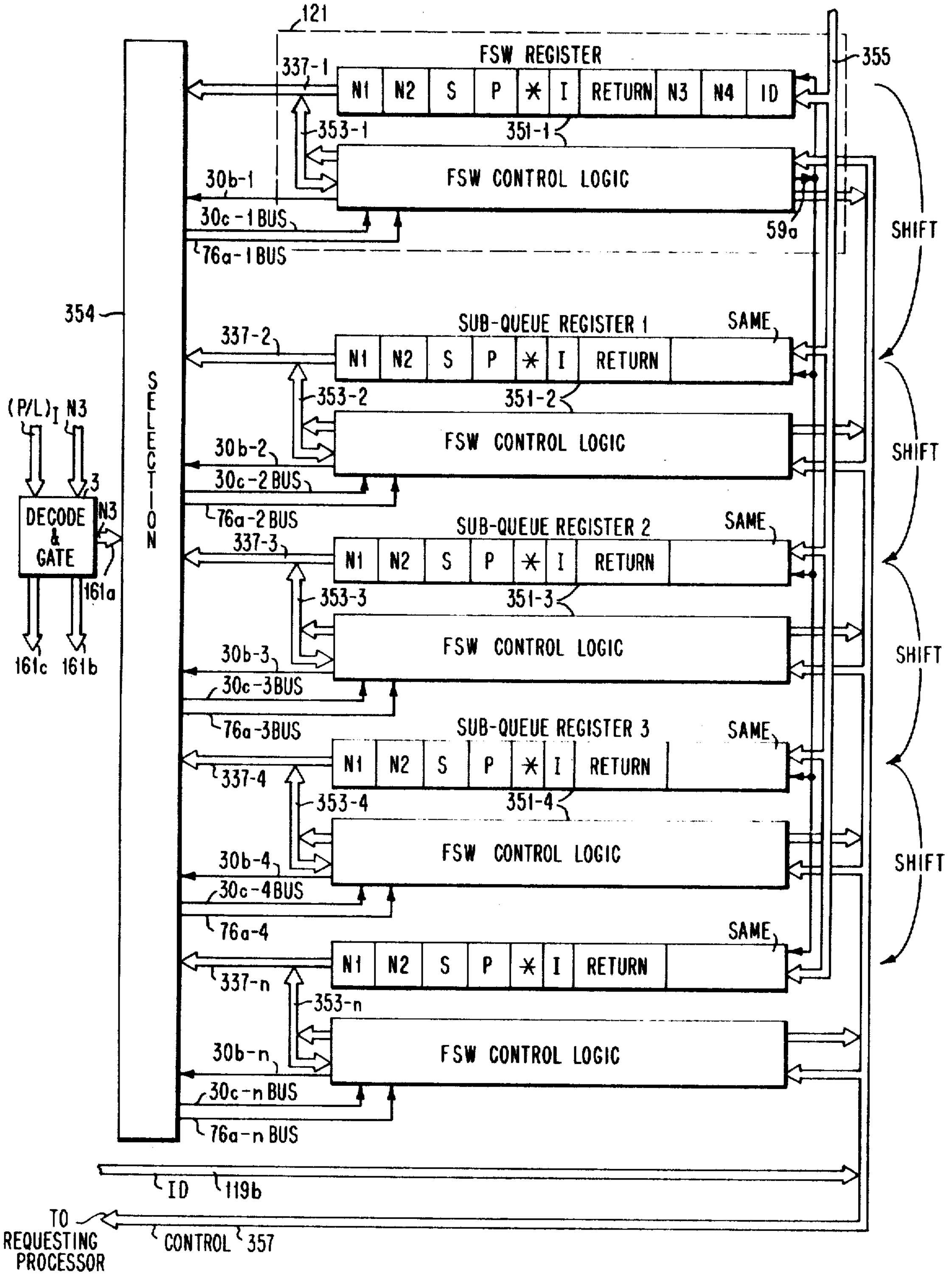
FIG. 6 shows an illustration of the interaction between the FSW register and control logic and the sub-queue registers and control logic for a given forking classification.

Turning now to FIG. 6, there is seen the combination of the FSW register and control logic 121 and the FSW sub-queue and control logic 123, both of which were seen in FIG. 3A.

The FSW register and the FSW control logic seen in 351 were described with reference to FIG. 4, above, as were the necessary control lines grouped together here in Bus 353. Bus 355 is the general bus over which the contents of each register are shifted downwardly one position. Line 58a, originally seen in FIG. 4, and as part of Bus 169 in FIG. 3a, is the line which transmits the shiftdown pulse to each register. Lines 30b–1, 30b–2,..., 30b–n originally seen in FIG. 4, cause selection means 353 to decode the N4 field transmitted over buses 337–1, 337–2,..., 337–n, respectively. Selection means 354, can be visualized as a group of decoders, one for each register in FIG. 6. The input to a given decoder is its respective N4 bus (337–n, where *i* goes from 1 to *n* ). Each respective decoder can be enabled by its respective 30b–i line; and the output of each decoder is a group of lines 30c–1, 30c–2,..., 30c–n for selecting the proper FSW. The actual use of the 30c–i line was explained relative to FIG. 4. Also, I.D. Bus 119b, first seen in FIG. 4, is connected to each FSW control logic apparatus in FIG. 6. The control lines, explained with respect to FIG. 4, which go to a requesting processor, are grouped together in the Control Bus 357.

OPERATION

With reference to FIG. 1A, there is seen at 1 a typical task comprising a sequence of instructions which are being performed by a particular process in the parallel processing system. As can be seen, the third instruction in this set of instructions is a fork, namely, FORK ($R_1,Q_1$), seen at 3. This is, for the present example, the first fork encountered, and is therefore termed the *issuing fork* inasmuch as tasks contained within the fork may themselves contain forks which may be called, individually, *internal forks*. The processor executing the instructions in the task seen at 1 is therefore called the issuing processor or $P_I$. When $P_I$ decodes FORK ($R_1,Q_1$), it issues an FSW, FSW 1 in this case. The FSW is as seen and explained previously in FIG. 2A. As seen at 9 in FIG. 1A, there are a number of tasks associated with this first fork. The items at 9 indicate pointers to the starting address of each individual task. For example, S1, P1, seen at 2 is a pointer to the storage address S1, containing the first instruction, and a pointer to the storage address P1, containing the first parameter for that task. The task itself is seen at 11 and includes instructions ($S_1,P_1$), $(S_1,P_1)_B$, and so on, ending up with a Join instruction, namely, $(JOIN)_1$, which is the Join point at which the processed data for FORK ($R_1,Q_1$) is to be coordinated. Other tasks associated with the first fork are seen at 13, 15,..., 20. As can be seen in 11, the first task in the fork ends at a Join; and the other tasks in the various tines of the fork are completed by End instructions. As can be seen in the tasks indicated at 15, a second fork is encountered. This represents the fork-within-fork situation and, in this case, is termed FORK ($R_2,Q_2$) with its associated FSW, FSW 2. This fork also has a number of tasks, the pointers to the initial instructions and parameters of each being given at 17. Since this fork was encountered during the third task, namely $S_3,P_3$, seen at 6 in FIG. 1A, the tasks associated with this second fork will be respectively termed $S_{3(S1,P1)}$, $S_{3(S2,P2)}$,..., $S_{3(SN,PN)}$. The instructions contained in each of these tasks are seen respectively at 20, 22, 24,..., 26. Again, the first task in a fork ends with a Join instruction while the tasks in the other tines of the fork complete with an End instruction.

For the present situation, it will be assumed that the (P/L) classifications of the forks are as given below:

FORK ($R_1,Q_1$)—$(P/L)_1$

FORK ($R_2,Q_2$)—$(P/L)_2$

It is further assumed that $P_I$ is a processor dedicated to the $(P/L)_1$ function so that it can immediately accept the first task in the fork, namely $S_1,P_1$. As will become more clear subsequently, it is assumed that the FSW queue is empty so that the FSW can immediately be placed in the FSW register 121 of FIG. 3A and FIG. 4 so that $P_I$ can immediately acquire the first task. Had there been a queue of FSW's from previous forks, then $P_I$ would have no assurance that it could immediately begin working on the first task inasmuch as there would be an FSW from a different fork in the FSW register. Therefore, $P_I$ would abort and ultimately be assigned to help out in perhaps another fork in the system. But for the present example, it is assumed that FSW 1 would bypass the FSW queue; and control operation will immediately begin on FSW 1.

Referring now to FIG. 5, it is seen that $P_1$ is sending instructions to the execution facilities via Bus 220. Initially, N3 in $P_1$ is set to zero. After sending over instructions OP(N–2) and OP(N–1) as seen in 1, processor $P_1$ decodes the instruction FORK ($R_1,Q_1$) seen at 3. This immediately causes line 25a in FIG. 5 to become active and gate the FSW contained in the instruction to register 233 via gate 230.

Concurrently, line 25c of FIG. 5 gates the tag, which contains the (P/L) designation of the present processor and the (P/L) designation of the fork to compare device 236. If the (P/L) designation of the issuing processor is not the same as the (P/L) designation of the fork, the not-equal line 238 would be gated with the priority abort line 240. If the priority about line were active and the not-equal line were active, then the * bit would be set in the FSW; the processor would abort to elsewhere in the system to where it was needed; and the FSW would be transferred to the control apparatus to have further processors assigned to it. In the present case, however, it is assumed that the issuing processor $P_1$ and the FSW are of the same (P/L) type. Hence, * is not set to its one state.

After a slight delay to allow the comparison of the (P/L) types, line 25d gates the FSW to the FSW register of FIG. 3A. Concurrently, the (P/L) designation is gated over Bus 129 to the control apparatus of FIG. 3A.

Referring to FIG. 3A, it is seen that the FSW proceeds over Bus 212a to register 113. The (P/L) designation is gated over Bus 129a to (P/L) decode 139 where it is decoded. (P/L) decode 139 may be a one out of N type binary decoder, decoding from a (P/L) designation to one of the lines designated $(P/L)_1$, $(P/L)_2$, $(P/L)_3$. In this case, since the fork type is $(P/L)_1$, the $(P/L)_1$ line will be activated. This will cause the contents of FSW address generator 39a to be gated to the N3 value of the FSW to be used as the address of that FSW. Since this is the first FSW, the address will be zero which will designate this FSW as the final FSW; that is, the first-issued FSW which will be the final FSW involved in the termination of control of the tasks in the operation. Concurrently, since it is assumed that the FSW queue for $(P/L)_1$ type is empty, line 149 will also activate AND gate 143 to gate the FSW via gate 137 over Bus 155 to FSW register and control logic 121. Concurrently, the activation of gate 143 causes line 159 to begin requesting resources by setting resource request flip-flop 109 to its one state, thus activating line 105 to cyclically select the processors listed in the resource table 101 for the $(P/L)_1$ type and individually test their busy bits. Each processor having a busy bit of zero while line 105 is activated will cause line 113 to gate that processor's I.D. via gate 115 over Bus 117 to the I.D. and control Bus 119a for the given (P/L) designation, in this case $(P/L)_1$. Concurrently, Bus 117 gates the I.D. to decoder 125 which decodes the processor's I.D. and activates the processor enable line for that particular processor to indicate that it should begin processing instructions as soon as it receives address information from the FSW. As can be seen with reference to FIG. 5, the processor enable line for a given processor, such as line 127a, is a signal to the instruction sequencer to begin action once instructions and data arrive from storage from Bus 211.

TASK DISTRIBUTION OPERATION

Figures 2C, 2D, 2E, 2F:
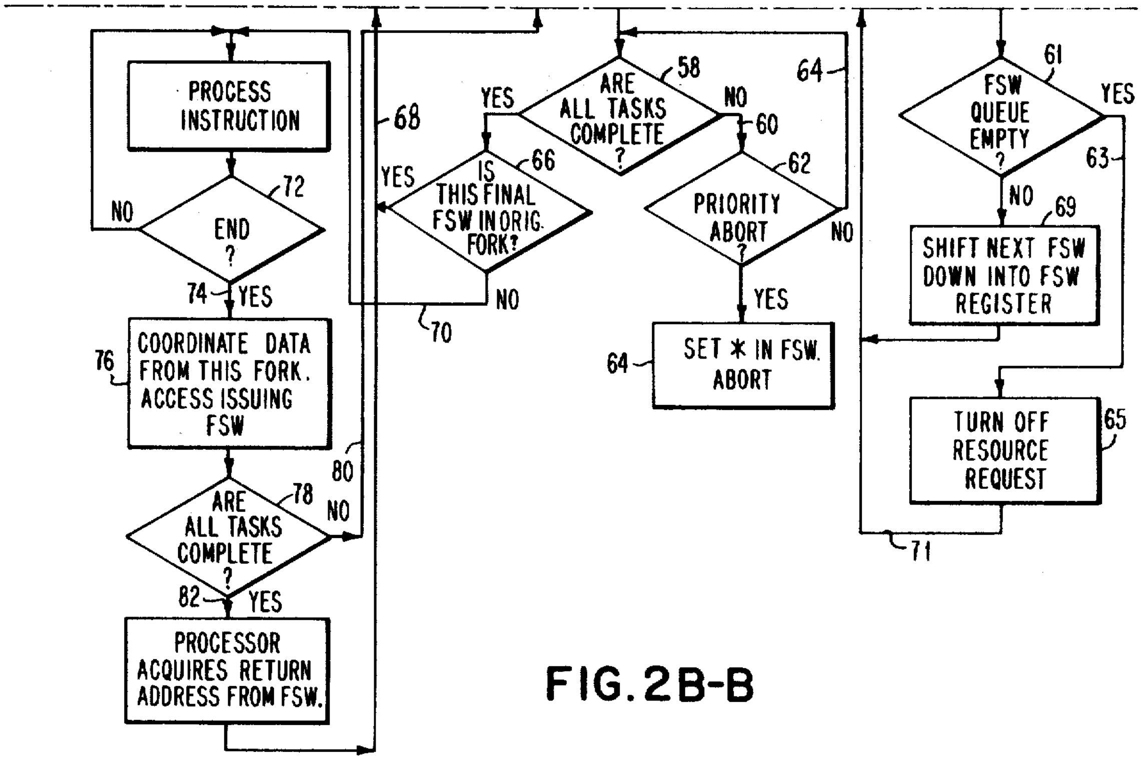

Referring now to FIG. 4, there is seen in more detail the FSW register and control logic seen generally at FIG. 121 in FIG. 3A. At this point, the FSW has just been gated into the FSW register and control logic. Line 309 from the in gate to the FSW register will send a signal through delay 311, of sufficient length to allow the FSW to be first gated into register 301, to then to enable gate 305 to gate the N1 field to zero test apparatus 49*a*. Concurrent reference should now be made to FIGS. 4, 1B, and 2A for a sufficiently clear understanding of the control and distribution of the tasks in a fork. Up to now, a fork has been detected as seen as 25 in FIGS. 2B–A, and the address of the issuing FSW has been inserted in to the FSW as explained previously. As seen at 41 in FIGS. 2B–A, resources have been requested by setting resource request flip-flop 109, and the FSW queue has been found to be empty so that the FSW is gated into the FSW register. Continuing with FIG. 4, zero test apparatus 49 *a* tests the N1 field of the current FSW. It can be assumed for this example that the FSW is initially as seen in FIG. 2C, with seven tasks in the fork. Therefore, at the outset, both N1 and N2 will be seven since there are seven undistributed tasks and, therefore, seven tasks incomplete, respectively. The FSW values are as seen in FIG. 2C. The (P/L) designation is 1, as assumed, and the * bit is set to zero, inasmuch as it is assumed that the issuing processor is the same type as the (P/L) class of the fork and will take on a task and will also possibly coordinate data at the Join point. The return address is set according to any desired storage convention and N4 is zero inasmuch as this is the first FSW and it has no issuing FSW ($N4=0$). Therefore, the I-bit is 1. Since N1 is 7, all tasks are not distributed; and the not-zero output 53*a* of zero tester 49*a* gates the address S1, P1, which are pointers to the first instruction and first data parameter of the first task, respectively, over Buses 201, 203, respectively, to the accessing processor. Concurrently, decrementer 53*b* decrements N1 to indicate that one task has been distributed. After a suitable delay, line 53*c* gates the N1 field via gate 325 to zero tester 55*a*. After decrementing N1, N1 will now be six so that the nonzero line 71*a* will be activated to enable the processor to begin processing the instructions beginning with S1, P1. Concurrently, each available resource, as indicated by resource table 101 of FIG. 3A, will individually activate resource available line 315 in order to have a task distributed to the resource in a manner similar to that explained for the original issuing processor.

TASK END OPERATION

Referring back to FIG. 1B, tasks of FORK ($R_1$, $Q_1$), namely, $S_1$, $P_1$; $S_2$,$P_2$;...;$S_7$,$P_7$, are distributed to processors as explained above. It may occur, however, that there are not enough processors available to each take on one of the seven tasks. Let it be assumed, for example, that only four processors are available to take on the seven tasks. Therefore, assume that four tasks have been distributed and none are complete. The FSW values in FSW register 301 are now as seen in FIG. 2D. It is to be assumed further that one of the processors to which a task was distributed has reached the end of its task. For example, and referring to FIG. 1A, it is assumed that the processor to which task S2,P2 has been assigned has reached the End instruction seen at 14. Referring to FIG. 5, when an End instruction is decoded, line 27*a* becomes active to activate line 233. Line 233 gates the N3 field and the processor I.D. to the control apparatus of FIG. 6. The N3 field enters the selection apparatus and is decoded to the proper FSW register of the control apparatus so that line 27*a* is gated to the proper FSW. Referring to FIG. 4, line 27*a*, having been gated to the proper FSW register, such as 301, is seen as 27*b* and causes decrementing apparatus 28*a* to decrement the N2 field by one, inasmuch as the accessing processor has just completed a task. After a suitable delay, line 27*b* gates the N2 field to zero test apparatus 30*a*, where it is tested for zero. If this were the final task to be completed, line 34*a* would be activated to initiate the ending procedure to be taken by the processor which is the last processor to finish a task associated with a given FSW. For now, it is assumed that N2 is not decremented to zero, but is decremented to the value six, as explained above. Therefore, the not-zero output of the zero test apparatus 30*a*, namely line 32*a*, gates the N1 field to zero tester 49*a* via outgate 307. Since N1 is presently three, as seen from FIG. 2D, the nonzero output 53*a* will gate the value of S and P over buses 201 and 203, respectively, to the accessing processor. Although not shown, it is evident that the I.D. present in register 313 can be used as a steering gate to distribute the S and P fields to the proper accessing processor. After a sufficient delay, line 53*c* will cause decrementers 323 and 325 to decrement the S and P fields by one; and line 53*c* will gate the N1 field to zero test apparatus 55*a* to determine whether the task just distributed was the last task. If it were the last task, the zero output 57*a* would shift down the sub-queue and if the FSW queue is empty will shift down all registers in order to enter a new FSW from the FSW queue into the FSW register to begin operation. However, in this case N1 will be decremented to two, the number seen from FIG. 2D; and so the nonzero output, namely 71*a*, will activate the processor enable signal to the accessing processor to signal it to begin processing the new task indicated by the pointers S and P which were just gated to that processor. Thus, action continues with tasks being distributed and ended as has just been explained.

JOIN AND FORK-WITHIN-FORK OPERATION

Example I

As can be seen in task $S_3$, $P_3$ of FIG. 1B, a situation is encountered wherein there is a fork within a fork, namely FORK ($R_2$,$Q_2$). It is assumed at this point that task $S_3$,$P_3$ which encounters this second fork is of a different (P/L) classification than the first fork. For example, in this case, $S_3$,$P_3$ is a $(P/L)_1$ designation while FORK ($R_2$,$Q_2$) is a $(P/L)_2$ designation. Referring to FIG. 5, line 25*a* and 25*c* are active. Line 25*c* gates the (P/L) designation tag from register 234 and the (P/L) designation of the newly decoded fork to comparator 236 where they are found not to be equal. In this case, assume the priority abort line 240 is not active. Therefore, line 252 will not set the * bit, and this processor will wait for FORK ($R_2$,$Q_2$) to be completed. Line 25*c* will also gate the tag into the $(P/L)_{I-1}$ field of the FSW. This will give the control apparatus a way to get back to the issuing (P/L) type when the fork within a fork is of a different (P/L) type than the issuing fork. This will be necessary at the completion of the fork. After sufficient delay to allow the above gating to take place, line 25*d* gates the FSW to the control apparatus of FIG. 3A where it is set into register 133. The (P/L) type is decoded in decoder 131 as before, and the FSW is gated to the proper FSW queue according to its (P/L) type. The $(P/L)_{I-1}$ designation is gated into the FSW from the contents of tag register 234 of the processor. That is, the processor gates into the $(P/L)_{I-1}$ field its (P/L) designation. Concurrently, line 37*a* in FIG. 5 gates the N3 field which is the address of the FSW on which this processor is currently working into the N4 field of the FSW. When the FSW is then sent to the control apparatus, the N4 and the $(P/L)_{I-1}$ fields will serve as steering field to enable the processor which coordinates data from this FSW, which is an internal FSW, to bootstrap its way back to the FSW from which this FSW was issued in order to complete control operation.

The return address in this situation would then be the address of the next instruction after the JOIN 2 instruction. As seen from FIG. 1A, this would be the address of $(S_3,P_3)_C$. The N3 designation would be 1 since this is the first FSW in the queue associated with $(P/L)_2$. The N4 designation, or the designation of the issuing FSW, would be 1, associated with a $(P/L)_{I-1}$ designation of 1 since this FSW was issued from a $(P/L)_1$ processor requesting assistance from $(P/L)_2$ processors. This information is summarized in FIG. 2E. Tasks are distributed as described previously with respect to FORK ($R_1$,$Q_1$). As can be seen from FIG. 1B, the processor to which was distributed the first task of this latter fork, namely task $S_3(S_1,P)$, will reach its join point, namely JOIN 2, before all tasks in this fork are complete. As can be seen from FIG. 5, the processor to which this task has been assigned will activate line 29*a* upon encountering JOIN 2 and will gate its I.D., (P/L)

tag and the N3 field to the decoding apparatus of FIG. 6 where the N3 field is gated to select the FSW indicated by N3. Assuming the proper FSW is now selected, and referring to FIG. 4, it is seen that the Join line 29b is gated to the proper FSW register such as 301 and gates N2 into the zero test apparatus 58b. In the present case, since it was assumed that all the other tasks are not completed, the nonzero line 60a is active to indicate to the accessing processor that the FSW is incomplete. Returning to FIG. 5, it is seen that line 60a, indicating that the FSW is incomplete, is connected, along with the Join line, to AND 62a. If the processor receives a signal over the priority line, this is an indication that it is to abort and allow another processor to complete the coordination of data in the fork. Therefore, 64a would be gated to set the * bit in the FSW register containing the proper FSW, in this case register 301 of FIG. 4. In this example, it is assumed that the processor will not abort; therefore, the processor continues testing the N2 field until such time as the zero test apparatus 58b indicates, via a signal over line 58c, that all tasks have been complete, that is, that the N2 field is equal to zero. Therefore, line 58c is activated.

The FSW fields are now as seen in 2F. N1 is zero which indicates that all the tasks have been distributed. N2 is zero, which indicates that the last task has just been completed. Since the * bit is zero, it means that the processor which issued this fork is waiting to coordinate data. N4 is one, and $(P/L)_{i-1}$ is one, which indicates that the address of the issuing FSW is the address of the first FSW in the FSW register sub-queue combination for $(P/L)_1$. The I.D. of the processor which issued this FSW, and is therefore waiting to coordinate data (since the * bit is zero), is processor 3. With continued concurrent reference to FIG. 2B and FIG. 4, it is seen at test 66 in FIG. 2B that it is necessary to test whether the completed FSW is the final FSW in this fork. Therefore, line 58c of FIG. 4 gates the line from the I-bit of the FSW, which indicates, if a 1, that the FSW is that FSW associated with the final fork, in AND-gate 66a. In the present case, since the processor under discussion has just decoded JOIN 2 of FORK $(R_2,Q_2)$, it has come to the Join of an internal fork, and so the I-bit of the FSW will be zero. Therefore, line 70a will be activated which indicates that the fork is incomplete. Referring to FIG. 5, it is seen that line 70a sets the Fork-Within-Fork Flip-Flop 247 to the one state, indicating that when the end of the current task is reached, it will be necessary to access the next FSW and continue control of the tasks associated therewith. Line 70a also activates processor enable line 127a of FIG. 5 to start the instruction sequencer processing the rest of the instructions seen between JOIN 2 and the End instruction in $S_3,P_3$ of FIG. 1B. The instruction sequencer 213 then begins sequencing instructions to the execution facilities. When the last-mentioned End instruction is detected, line 27c will be gated with line 253 from flip-flop 247 in AND-gate 255 to activate line 76a to access the net FSW and also to reset flip-flop 247 to its zero state. To access the next FSW, which is FSW 1, it is necessary to gate N4, the $(P/L)_{i-1}$ designation, and I.D. of the waiting processor, which was explained above with reference to FIG. 2F to the selection means. This is done as follows. Line 70b in FIG. 4, connected from 70a, gates the N4 field to gate facility 347 and causes the $(P/L)_{i-1}$ to be decoded in decode 339. One of the lines 341, 343, 345 causes the gate facility 343 to gate the I.D. of the processor which has just encountered the Join, as well as the N4 field and control lines to the selection means of FIG. 6 to be gated to the register containing the appropriate FSW, that is, the FSW which issued that FSW within which the accessing processor encountered the Join instruction. It will be recalled that line 76a to the select means was activated by the processor encountering the End instruction after the Join instruction, via AND-gate 255 of FIG. 5. Field N4, transmitted to the proper selection means of FIG. 6, is decoded and gates the line 76a and line 76b to the proper FSW register. Assuming for illustration that the proper FSW register is the one seen in FIG. 4, line 76b at the top of the figure tests to see whether all tasks are completed in this, the preceding FSW, which, in our example, would be the FSW associated with FORK $(R_1,Q_1)$ as seen in FIG. 1B. This is done by gating the N2 field to the zero test apparatus 78a.

It is assumed for this example that at this point all of the tasks in FORK $(R_1,Q_1)$ have been distributed, but not all are completed. Therefore, the nonzero line 80a of zero test apparatus of 78a will be activated and will set the free bit for the accessing processor and also cause the processor to store its data in its convention storage area. As the processors to which the tasks $S_1,P_1$; $S_2P_2$;...;$S_n,P_n$ have been assigned complete their tasks, they report in over line 27b, decrement the N2 field, and test the N2 field in zero tester 30a. Those which decrement N2 to a number other than zero will cause line 32a from zero test apparatus 30a to be activated to test the N1 field in order to determine whether or not there are any more tasks left to distribute. Since it is assumed that all are distributed, line 51a is activated which sets the free bit and causes the particular processor to store its data in its convention storage. The last processor finishing this task, for example, the processor which was assigned task $S_2,P_2$, (which is assumed to be the longest task in FORK $(R_1,Q_1)$, causes line 27b of FIG. 4 to decrement N2 to zero. Zero test apparatus 30a will then detect N2 to be zero, indicating this is the last processor completing a task in the fork. This activates line 34a which indicates that all tasks in FORK $(R_1,Q_1)$ are complete. Line 34a also tests the * bit. Since processor $P_i$ has been waiting, the * bit will be zero, so that 38b will set the free bit for this accessing processor which completed the last task in the original FORK $(R_1,Q_1)$. Line 38b will also gate an enable signal to the waiting issuing processor whose I.D. is in register 301. The signal over line 38b causes line 38c to signal the processor to coordinate final data from all tasks.

OPERATION WHEN ISSUING PROCESSOR ABORTS—"LAST PROCESSOR OUT" COORDINATES DATA

If $P_i$ has set the * bit in the FSW associated with FORK $(R_1,Q_1)$ and had aborted, then that processor which is the processor to finish the last task in the fork, i.e., the "last processor out," must coordinate data at the Join point. This can occur in two ways. In the situation where the issuing processor has aborted, it has set the * bit in its FSW. When its FSW issues its first task, such as $S_1,P_1$, to a processor, it also sets the $P_i$ not-waiting flip-flop in FIG. 5 by way of line 85a which is connected from the * bit in FIG. 4. Thus, when that processor comes to the JOIN 1 point, as it will, line 29a is gated with the $P_i$ not-waiting line 85b AND 85c. If this line is active, then the output of AND-gate 85c will essentially gate an End signal to the control apparatus via the Gated End line: and a new task will be distributed to this processor on the first task in the fork, if there are more tasks to be distributed. This will take place as was explained above with regard to line 27b of FIG. 4. Thus, in a situation where the issuing processor has aborted, the first processor, which takes on tasks $S_1,P_1$, will not wait at the Join point, but will become another system processor due to the Gated End signal developed by way of flip-flop 85, which is one way in which a processor which reaches a Join point knows that it is not the issuing processor. This is to be distinguished from the situation described previously in which the issuing processor takes on the first task as $S_1,P_1$. Task distribution and ending operation continues as described previously for the situation in which $P_i$ did not abort. However, that processor which completes the last task of FORK $(R_1,Q_1)$ decrements the N2 field in FIG. 4 to zero. Line 27b in FIG. 4 then tests N2 for zero in zero tester 30a. The zero output 34a is then activated and is gated in gate 40b with the * bit which has been set to 1, indicating that the issuing processor has aborted. Therefore, line 42a gates the return address to the accessing processor and also signals the processor that it is the last processor out and is to coordinate data. This sets the flip-flop 86a in FIG. 5 to send a signal to storage to coordinate data at predetermined storage locations. When data is coordinated, a data-coordinated signal sets flip-flop 86a to its zero side and signals the instruction sequencer to begin processing instructions. Referring to FIG. 1b, it will be recalled that the Return instruction which was sent to this processor over Bus 205a of FIG. 5 contains the address of the first instruction after JOIN 1, namely OP(1). Therefore, this processor, after data is coordinated, continues down the instruction stream and completes the task. It will be recognized that in the instruction stream there may again be other fork instructions, but they are handled similarly to that described in the fork of FIG. 1b.

If the output of AND 85c of FIG. 5 were inactive, then the Join line would be gated to the control apparatus as a Join, rather than a Gated End.

JOIN AND FORK-WITHIN-FORK OPERATION

Example 2

Referring again to FIG. 1B, it is assumed that, for this example, both the processor which issued FORK ($R_1$,$Q_1$) and the processor which issued FORK ($R_2$,$Q_2$) aborted and each set the * bit in the associated FSW. It is assumed at this point that only four tasks of FSW 1 have been distributed and none have been completed. Therefore, the FSW associated with FORK ($R_1$,$Q_1$), at this time, is as seen at FIG. 2G. It is further assumed that all tasks of the FSW associated with FORK ($R_2$,$Q_2$) have been distributed and the task $S_3$($S_2$,$P_2$) is the longest task in time in FORK ($R_2$,$Q_2$). Therefore, when the processor processing that task comes to the END, it goes back to the FSW and decrements N2 to zero, as explained previously. The * bit is set to a 1. This indicates that this processor is the last processor out. Therefore, the return portion of the FSW is associated with FORK ($R_2$,$Q_2$), [namely $\gamma^2$, $(S_3,P_3)_C$ of FIG. 1B]. This is seen schematically by line 800. Therefore, this processor which is the last processor out continues down the line of the first task of FORK ($R_2$,$Q_2$) and processes instructions ($S_3$,$P_3$), $(S_3,P_3)_D$, and so on until it reaches the End instruction. Upon reaching the End instruction, and since the Fork-Within-Fork Flip-Flop 247 of FIG. 5 will have been set to a 1 for the same reason as was explained with respect to example 1 above, the processor will determine whether or not this is the final FSW in the fork and will therefore access the issuing FSW in a manner explained previously. If all tasks are not distributed, the processor will take on a task from the issuing FSW and become one of the fork processors in the issuing fork. As can be seen from FIG. 2G, all tasks are not distributed, since it was assumed that N1 was 3 at this point. Eventually, all tasks from FORK ($R_1$,$Q_1$) will be distributed and will ultimately be completed. It is assumed from FIG. 1B that task $S_2$,$P_2$ is the longest task in that fork. Therefore, the processor finishing that End instruction will determine, from the * bit in that FSW, that it is the last processor out and will then go to the return address in storage, which is the address of instruction $\gamma_1$OP(1) and will complete that line of instructions to the End instruction. This is seen by line 806 of FIG. 1B. At this point a fork is complete.

SUB-QUEUE OPERATION

It may occur that a given fork comprises a few tasks, long in length. Depending upon the size of the system, there may be more than enough system processors to assign one to each task. At his point, the system may be held up because of the fact that all tasks are not complete, but that the FSW register is tied up controlling the completion of the distributed tasks and can, therefore, not distribute tasks from another FSW to available system resources. Therefore, the FSW sub-queue seen in FIG. 4 is included. Operation is as seen in FIG. 2K. In that figure, FSW 1, associated with a first fork is placed in the FSW register and tasks are assigned to available system processors. When all tasks are assigned, all registers are shifted down one position. This may occur for several FSW's. In FIG. 2L, it is seen that the 5th FSW in a group of FSW's is in the FSW register having tasks assigned. Each of the four previous FSW's have been shifted down, once each time all its tasks were distributed, and are as shown as they are resident in the FSW sub-queue. As tasks complete in the FSW's in the FSW sub-queue, these FSW's remain resident in a waiting state until such time as the Join instruction for a given FSW is encountered by the processor having the initial task associated with that FSW. At this point, the processor issuing the Join instruction then accesses the next FSW which is resident in the FSW sub-queue, as was explained previously in the section of this specification entitled Join and Fork-Within-Fork Operation. This action continues until all forks are completed. It will be appreciated that FIGS. 2K and 2L show operation for only a given (P/L) type queue structure. However, as was explained previously, when reaching a Join instruction, a given processor can access to a different (P/L) class queue structure by use of the $(P/L)_{i-1}$ field and await completion of that FSW.

It will be appreciated that many modifications can be made of our invention. For example, each task in the fork, as seen in FIG. 1A, could end with an END instruction, rather than having the first instruction end with a Join instruction. In that event, and by way of suitable gating circuitry, the return address would then be the return of the Join instruction, after which all data would be coordinated. Further, it will be recognized by one of ordinary skill in the art that gating between FSW control apparatus of the various (P/L) types can be done by other gating means not involving the N4–(P/L) combination contained in the FSW. Furthermore, all of the gating shown in the present embodiment can be done in many other ways than that shown, as is well known by those readily conversant with the digital computer art. It will further be appreciated that instead of using an FSW register, a word, or a number of words, in storage could be reserved from which to control the FSW. Therefore, the Fork instruction would be of the form FORK ($\alpha$, Q) wherein $\alpha$ would be a storage location containing the FSW and Q could be the (P/L) type of operation desired.

While the invention has been particularly shown and described with reference to a preferred embodiment thereof, it will be understood by those skilled in the art that the forgoing and other changes in form and details may be made therein without departing from the spirit and scope of the invention.

We claim:

1. In a multiple-operand stream computing system wherein data processing tasks are designated as capable of being operated upon in parallel, the combination of:

a plurality of data processing elements, each for operating on a stream of instructions:

resource posting means responsive to said plurality of data processing elements for listing the status of each of said plurality of data processing elements;

means for detecting the occurrence, in a given one of said streams of instructions, of a group of data processing tasks which can be operated upon in parallel;

means associated with each data processing element and responsive to the detection of said occurrence, for issuing from the data processing element operating upon said given one of said streams of instructions, a request for data processing elements to operate upon individual ones of said tasks, said request having associated therewith an indication of the number of tasks awaiting distribution to individual ones of said plurality of data processing elements;

means responsive to said resource posting means for detecting free data processing elements;

means responsive to the detection of a free data processing element, for testing said indication of the number of tasks awaiting distribution;

means responsive to the detection of a least one awaiting task in said last-named test, for distributing one of said at least one awaiting tasks to said free data processing element;

a second and a third indication, associated with said request, for indicating the number of distributed but incompleted tasks in said group, and whether or not said issuing data processing element is retaining its status as the issuing data processing element, respectively;

means for decrementing said second indication each time a task is completed;

means responsive to said decrementing means for testing said second indication after each decrementation to determine whether the last task of said group is completed;

means responsive to the detection of the completion of said last task for testing said third indication to detect whether said data processing element issuing said request is retaining its status as the issuing data processing element;

means responsive to the detection of the condition that said issuing data processing element is retaining its status as the issuing date processing element for gating to said issuing data processing element an indication to coordinate data and continue processing instructions in said given one of said streams of instructions; and means responsive to the detection in said last-named test that said issuing data processing element is not retaining its status as the issuing data processing element for gating to the processing element which completed the last task in said group, an indication to coordinate data and continue processing instructions in said given one of said streams of instructions.

2. In a multiple-operand stream computing system wherein data-processing tasks are designated as being capable of performance in parallel, the method of:

processing a given stream of instructions by an issuing data processor;

decoding, in said given stream of instructions, an indication that a plurality of data processing tasks of a particular type are capable of being operated upon in parallel;

decoding the type of task contained in said plurality;

issuing to a facility dedicated to said decoded type of task, a request for additional processors;

dynamically distributing tasks to data processors as each processor becomes available to process a task;

testing an indication to determine whether or not said issuing data processor is maintaining its status as said issuing data processor;

issuing, in response to the detection that said issuing processor is maintaining its status as the issuing processor, a signal to said issuing processor to coordinate data from said plurality of tasks and to continue processing instructions in said given instruction stream, after the final task in said group has been completed; and issuing, in response to the determination that said issuing processor has not retained its status as the issuing processor, an indication to the processor which completed that final task in said plurality of tasks to coordinate data and continue processing instructions in said given stream of instructions.

3. A multiple instruction stream computing system wherein computational tasks are designated as being of a specific physical or logical function type, and further designated as being operable upon in parallel, the combination of:

a plurality of data processing elements, each for processing a respective stream of instructions, each said element individually dedicated to said specific physical and logical functions;

resource posting means responsive to said plurality of data processing elements for listing the status of each of said plurality of data processing elements;

means for detecting the occurrence in a given one of said streams of instructions, of a group of data processing tasks which can be operated upon in parallel.

means for detecting the occurrence in said given one of said streams of instructions, the designation of the physical or logical function type of said tasks which can be operated upon in parallel;

means responsive to the detection of said occurrence for issuing from the data processing element operating upon said given one of said streams of instructions a request for data processing elements to operate upon individual ones of said tasks, said request having associated therewith an indication of the number of tasks awaiting distribution to requesting data processing elements;

means for scanning said resource posting elements for detecting free data processing elements dedicated to the same physical or logical function type as said tasks;

means responsive to the detection of a free data processing element for testing said indication of the number of tasks awaiting distribution;

means responsive to the detection of at least one awaiting task in said last-named test, for distributing one of said awaiting tasks to said free data processing element;

a second and third indication, associated with said request, for indicating the number of distributed but incompleted tasks in said group, and whether or not said issuing data processing element is retaining its status as the issuing data processing element, respectively;

means for decrementing said second indication each time a task is completed;

means responsive to said decrementing means for testing said second indication after decrementation to determine whether the last task of said group is completed;

means responsive to the detection of the completion of said last task for testing said third indication to detect whether the data processing element issuing said request is retaining its status as issuing data processing element;

means responsive to the detection of the condition that said issuing data processor is retaining its status as the issuing data processing element, for gating to said issuing data processing element an indication to coordinate data and continue processing instructions in said given one of said streams of instructions, and;

means responsive to the detection in said last-named test that said issuing data processing element is not retaining its status as the issuing data processing element, for gating to the processing element which completed the last task in said group, an indication to coordinate data and continue processing instructions in said given one of said streams of instructions.